(12) United States Patent
Harris et al.

(10) Patent No.: US 10,671,853 B2
(45) Date of Patent: Jun. 2, 2020

(54) MACHINE LEARNING FOR IDENTIFICATION OF CANDIDATE VIDEO INSERTION OBJECT TYPES

(71) Applicant: Mirriad Advertising PLC, London (GB)

(72) Inventors: Tim Harris, London (GB); Philip McLauchlan, London (GB); David Ok, London (GB)

(73) Assignee: MIRRIAD ADVERTISING PLC, London (GB)

(*) Notice: Subject to any disclaimer, the term of this patent is extended or adjusted under 35 U.S.C. 154(b) by 0 days.

(21) Appl. No.: 16/116,809

(22) Filed: Aug. 29, 2018

(65) Prior Publication Data

US 2019/0065856 A1  Feb. 28, 2019

(30) Foreign Application Priority Data

Aug. 31, 2017  (GB) .................................. 1714000.5

(51) Int. Cl.
*G06K 9/00* (2006.01)
*G06K 9/62* (2006.01)
*G11B 27/036* (2006.01)

(52) U.S. Cl.
CPC ....... *G06K 9/00718* (2013.01); *G06K 9/6257* (2013.01); *G06K 9/6263* (2013.01); *G06K 9/6277* (2013.01); *G11B 27/036* (2013.01); *G06K 2209/27* (2013.01)

(58) Field of Classification Search
CPC ........... G06K 2209/27; G06K 9/00718; G06K 9/6257; G06K 9/6263
See application file for complete search history.

(56) References Cited

U.S. PATENT DOCUMENTS 9,961,388 B2 *  5/2018  Harrison .............. H04N 21/233
2007/0005795 A1  1/2007  Gonzalez
2008/0046920 A1  2/2008  Bill
(Continued)

FOREIGN PATENT DOCUMENTS

WO  2009/144464 A1  12/2009
WO  2015/047246 A1  4/2015
WO  2017/066874 A1  4/2017

OTHER PUBLICATIONS

United Kingdom Intellectual Property Office, Search Report under Section 17(5) Application No. GB1714000.5, dated Feb. 14, 2018.
(Continued)

*Primary Examiner* — John J Lee
(74) *Attorney, Agent, or Firm* — SoCal IP Law Group LLP; Jonathan Pearce

(57) ABSTRACT

The method disclosure provides methods, systems and computer programs for identification of candidate video insertion object types using machine learning. Machine learning is used for at least part of the processing of the image contents of a plurality of frames of a scene of a source video. The processing includes identification of a candidate insertion zone for the insertion of an object into the image content of at least some of the plurality of frames and determination of an insertion zone descriptor for the identified candidate insertion zone, the insertion zone descriptor comprising a candidate object type indicative of a type of object that is suitable for insertion into the candidate insertion zone.

20 Claims, 14 Drawing Sheets

(56) References Cited

U.S. PATENT DOCUMENTS

| | | |
|---|---|---|
| 2009/0222854 A1 | 9/2009 | Cansler et al. |
| 2010/0273553 A1* | 10/2010 | Zalewski ............. H04N 21/235 |
| | | 463/31 |
| 2014/0359656 A1 | 12/2014 | Banica et al. |
| 2016/0212455 A1* | 7/2016 | Manna ................... G06Q 30/02 |

OTHER PUBLICATIONS

European Patent Office, Extended European Search Report for European Patent Application No. EP 18191297.3, dated Jan. 24, 2019.
European Patent Office, Exam Report for European Patent Application No. 18 191 297.3, dated Jan. 24, 2020. 4 pages.
Lin, Liang et al. "Deep Structured Scene Parsing by Learning with Image Descriptions," ARXIV.org, Cornell University Library, 201 Olin Library Cornell University Ithaca, NY 14853, Apr. 8, 2016, XP081352192.

\* cited by examiner

Here are the top 20 product categories:

3381 Drink
1573 Food
1421 Cosmetics & Personal Care
1178 Electronics & Household Appliances Audio
1093 Food Confectionery & Snacks
883 Electronics & Household Appliances Photography
848 Clothing & Accessories Personal Accessories
816 Drink Soft Drinks
793 Telecoms
651 Games & Consoles
632 Drink Sports - Energy Health Drinks
512 Drink Hot Beverages
381 Household Equipment & DIY Furnishing Accessories
369 Drink Spirits & Liqueurs
368 Household FMCG Tissues, Papers & Wipes
364 Drink Wine
357 Drink Beer Larger & Cider
332 Tobacco & Accessories
331 Pharmaceutical

FIG. 3

FIG. 4

FIG. 5

Character List:
    Number of labels:
2 genders + 9 age brackets
Full list:
Gender:
- Male
- Female Age:
- Under 12 years old
- 12-17 years old
- 18-24 years old
- 25-34 years old
- 35-44 years old
- 45-54 years old
- 55-64 years old
- 65-74 years old
- 75 years or older

FIG. 7a

OBJECT LIST:

Number of labels:
    16

Full list

- Drink (soft drink, hot beverage, wine, beer), Container (bottle, can, glass, mug)
- Food Confectionery & Snacks, Ready/Prepared Meals
- Food Cupboard/Grocery, Bakery
- Household FMCG - Tissues "Papers & Wipes"
- Electronic & Household Appliances - Audio
- Electronic & Household Appliances - Photography
- Electronic & Household Appliances - Small Appliances-Home
- Games & Consoles
- Cosmetics & Personal Care
- Clothing & Accessories - Personal Accessories
- Car
- Magazine
- Pharmaceutical
- Mobile phone/tablet
- Laptop
- Household Equipment & DIY-Furnishing Accessories
- TV

FIG. 7b

SURFACE LIST:
> Number of labels:
> 9

Full list
> - table
> - counter
> - shelf
> - interior wall
> - Exterior wall
> - computer
> - tv
> - sidewall/pavement
> - dresser

FIG. 7c

LOCALE LIST:

Number of labels:
41 locales

Full list

ID CATEGORY NAME
RES. 1 Residential living-room
RES. 2 Residential common-room
RES. 3 Residential bedroom
RES. 4 Residential kitchen
RES. 5 Residential dining room
RES. 7 Residential study
RES. 8 Residential hallway
RES. 9 Residential swimming-pool
RES. 10 Residential garden
RES. 11 Residential outdoor day non garden
RES. 12 Residential outdoor night non garden
RES. 13 Residential unspecified
CAT. 1 Catering restaurant
CAT. 2 Catering restaurant outdoor
CAT. 3 Catering bar
CAT. 4 Catering bar-pub
OUT. 1 Outdoor day urban street
OUT. 2 Outdoor night urban street
OUT. 3 Outdoor day park
OUT. 4 Outdoor night Park
OUT. 5 Outdoor day non urban
OUT. 6 Outdoor night non urban
OUT. 7 Outdoor aerial
OUT. 8 Outdoor day unspecified
OUT. 9 Outdoor night unspecified
SHO. 1 Game/Panel/Talk-show set
SHO. 2 Game/Panel/Talk-show unspecified (backstage, makeup room)
WOR. 1 Workspace office room
WOR. 2 Workspace meeting room
WOR. 3 Workspace hallway
WOR. 4 Workspace unspecified
OTH. 1 Other Hospital
OTH. 2 Other School
OTH. 3 Other Beach
OTH. 4 Other Stadium
OTH. 5 Other Hotel
OTH. 6 Other Car Park
OTH. 7 Other Train Station
OTH. 8 Other Airport
OTH. 9 Other Concert

FIG. 7d

MACHINE LEARNING FOR IDENTIFICATION OF CANDIDATE VIDEO INSERTION OBJECT TYPES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This application is based on and claims the benefit of priority from UK Patent Application No. GB 1714000.5, filed on Aug. 31, 2017, the content of which is incorporated herein by reference.

TECHNICAL FIELD

The present disclosure relates to a system, method, software and apparatus for processing the image contents of a plurality of frames of a scene of a source video and for training the system and apparatus thereof.

BACKGROUND

With the advent of digital file processing, it is possible to digitally insert objects (also referred to herein as "embed") into a video. Digitally inserting objects in a video may have many benefits, for example enhancing the visual effects of the video, or improving the realism of a video, or allowing more flexibility for the video after it is shot, meaning that fewer decisions need to be made regarding objects to include in a scene at the stage of filming the scene. Consequently, digital object insertion is becoming increasingly common and utilised by video makers for all manner of purposes.

Currently, digital object insertion typically requires a number of processing stages. Although described further below, these can broadly be broken down into:
1. the detection of cuts;
2. the fusion and grouping of similar shots;
3. the detection of insertion opportunities (referred to interchangeably throughout as insertion zones);
4. the contextual characterisation of insertion zones; and
5. the matching between insertion zones and objects for insertion.

Detection of Cuts

A programme may typically be a half hour or hour-long show, and programme material is decomposed into shots. Shots are a consecutive sequence of frames which do not comprise any edit points, i.e., they usually maintain a coherence which indicates that they were recorded by a single camera.

They are delineated by cuts, where the camera usually stops recording, or the material is edited to give this impression. Broadly speaking, there are two types of cuts: "hard" cuts and "soft" cuts. A hard cut is detected when the visual similarity between consecutive frames abruptly breaks down, indicating an edit point or a change in camera angle, for example. A soft cut corresponds to the beginning or end of a soft transition, for example a wipe or a fade transition, characterised by a significant but gradual change in the visual appearance of the video across several frames.

First, it may be necessary to analyse the source video material (for example, the programme material), and locate suitable scenes for object insertion. This is usually referred to as a pre-analysis pass, and is best done by dividing the source video into scenes, and particularly into scenes shot from the same camera position. Segmentation of video material into scenes may typically be performed automatically, using shot change detection. A video analysis module may automatically detect hard and soft cuts between different shots, which correspond to hard and soft transitions respectively.

Fusion and Grouping of Similar Shots

Once a shot or shots have been detected, continuity detection may also be applied in a further processing step to identify similar shots that have been detected in the source video. In this way, when an insertion opportunity is identified in one shot, a shot similarity algorithm can identify further shots in which the same opportunity is likely to be present.

Detection of Insertion Zones

Image regions in the source video content that are suitable for insertion of additional material are referred to as insertion zones, and these can broadly be categorised into surfaces and objects. In general, a surface may be suitable for the insertion of material. In the case of a wall, for example, a poster might be added. In the case of a table, an object such as a drink may be inserted. When an object is identified as an insertion zone, the opportunity for insertion material may relate to rebranding any brand insignia identified on the product, replacement of the object with another object belonging to the same class of objects, or the addition of a further similar object in close proximity with the object.

Detecting insertion zones can be pursued and refined through the tracking of coherently moving pixels throughout the source video material. Image-based tracking techniques include but are not limited to planar tracking algorithms to compute and model 2D transformations of each image in the source video.

Contextual Characterization of Insertion Zones

An operator may be required to assess the identified insertion zone and provide context for the possible additional material which may be inserted therein. With the rapid rise in the amount of digital video content which is being broadcast or streamed via the internet, the fact that a human operator is not able to process insertion opportunities to identify context much faster than in real time may be a problem.

Matching Between Insertion Zones and Product Categories

It is not enough to merely identify the insertion opportunities through pattern recognition processes, there may also need to be some intelligence applied when selecting the material which is to be inserted into the video content.

For an instance of object insertion not to detract from the viewing experience, it should make sense within the context of the source video content into which it is placed. If a scene takes place in a kitchen, for example, additional content to be placed in that scene should be relevant to the objects that the viewer would expect to see in that location. For example, one would perhaps not expect to see a perfume bottle located on a kitchen side board next to a kettle. Much more suitable in the context described might be a jar of coffee. Likewise a bathroom scene is suitable for the placement of bathroom or hygiene related items, rather than groceries. Consequently, an operator may be required to assess the scene to select a particular object or category of objects that would be suitable for insertion in any identified insertion zone. Again, the fact that a human operator is not able to process insertion opportunities to identify context much faster than in real time may be a problem.

It may be appreciated from the above that the identification of insertion zone opportunities and suitable objects for insertion may typically be a time consuming, multi-stage process that may limit the volume of video material that can be analysed.

SUMMARY

In a first aspect of the present disclosure, there is provided a system comprising: a candidate insertion zone module configured to: receive a plurality of frames of a scene of a source video; and process, at least in part using machine learning, image contents of the plurality of frames to: identify a candidate insertion zone for the insertion of an object into the image content of at least some of the plurality of frames; and determine an insertion zone descriptor for the identified candidate insertion zone, the insertion zone descriptor comprising a candidate object type indicative of a type of object that is suitable for insertion into the candidate insertion zone.

The candidate insertion zone module may comprise: an identification sub-module configured to perform the identification of the candidate insertion zone and the determination of the insertion zone descriptor for the identified candidate insertion zone, and to: determine, for at least some of the pixels of the plurality of frames of the scene, an insertion probability vector comprising a probability value for each of a plurality of insertion labels, each probability value being indicative of the likelihood that the type of insertion indicated by the corresponding insertion label is applicable to the pixel.

The plurality of insertion labels may comprise a label indicative of the pixel not being suitable for insertion of an object; and one or more labels indicative of a corresponding one or more types of object.

The candidate insertion zone may comprise a plurality of pixels having insertion probability vectors that all have a maximum argument of probability values corresponding to a label that is indicative of the candidate object type.

The candidate insertion zone module may comprise: a scene descriptor sub-module configured to process, using machine learning, image contents of at least some of the plurality of frames to determine a scene descriptor, wherein determination of the candidate object type is based at least in part on the scene descriptor.

Identification of the candidate insertion zone may be based at least in part on the scene descriptor.

The scene descriptor may comprise at least one global descriptor, wherein each global context descriptor is indicative of any one of: Scene locale; Mood; Demographic; Human Action; Time of day; Season of the year; Weather; and/or Filming Location.

The scene descriptor sub-module may be further configured to: receive audio content relating to the scene of the source video; and determine the scene descriptor based at least in part on the received audio content.

The scene descriptor may comprise at least one regional context descriptor indicative of an identified entity in the scene. The at least one regional context descriptor may be indicative of an identified entity in the scene being any one of: a human; an animal; a surface; or an object.

The scene descriptor sub-module may be configured to process, using machine learning, image contents of the plurality of frames to determine, for at least some of the pixels of the plurality of frames of the scene, a regional context probability vector comprising a probability value for each of a plurality of regional context labels, each probability value being indicative of the likelihood that the type of entity indicated by the corresponding regional context label is applicable to the pixel.

The plurality of regional context labels may comprise: a label indicative of the pixel not relating to anything; and at least one of: one or more labels indicative of a human; one or more labels indicative of an animal; one or more labels indicative of an object; and/or one or more labels indicative of a surface.

The candidate insertion zone module may further comprise: a database comprising a contextually indexed library of types of insertion object; wherein determining the candidate object type is based at least in part on the library of types of insertion object and the scene descriptor.

In an alternative, the candidate insertion zone module may further comprise: an insertion zone and insertion object identification sub-module configured to identify the candidate insertion zone and the candidate object types by processing, using machine learning, image contents of the plurality of frames to determine, for at least some of the pixels of the plurality of frames of the scene, an insertion probability vector comprising a probability value for each of a plurality of insertion labels, each probability value being indicative of the likelihood that the type of insertion corresponding insertion label is applicable to the pixel. The plurality of insertion labels may comprise: a label indicative of the pixel not being suitable for insertion of an object; and one or more labels indicative of a corresponding one or more types of object being suitable for insertion in the pixel. The candidate insertion zone may comprise a plurality of pixels having insertion probability vectors that all have a maximum argument of probability values corresponding to a label that is indicative of the candidate object type.

In any of the system implementations identified above, the candidate insertion zone module may further comprise a post-processing sub-module configured to determine a time duration of the candidate insertion zone across the plurality of frames and/or a size of the candidate insertion zone.

The insertion zone descriptor may further comprise at least one of the time duration of the candidate insertion zone across the plurality of frames and/or the size of the candidate insertion zone.

The post-processing sub-module may be further configured to determine a Video Impact Score based at least in part on the time duration of the candidate insertion zone across the plurality of frames and/or a size of the candidate insertion zone.

In any of the system implementations identified above, the system may further comprise: a segmentation module configured to: generate an insertion zone suggestion frame comprising a frame of the plurality of frames overlaid with a visualisation of the candidate insertion zone.

In any of the system implementations identified above, the system may further comprise: an object insertion module configured to: select an object for insertion based on the candidate object type; and generate an object insertion suggestion frame comprising a frame of the plurality of frames and the selected object inserted in the candidate insertion zone.

In any of the system implementations identified above, the candidate insertion zone module may be further configured to: receive feedback from an operator, wherein the feedback is indicative of the suitability of the identified candidate insertion zone and/or the candidate object type for the image contents of the plurality of frames; and modify the machine learning based at least in part on the feedback.

The system may further comprise a final insertion module configured to receive an object or additional material for insertion into the scene of the source video and generate output material comprising at least part of the source video and the received object or additional material inserted into the candidate insertion zone, wherein the received object or additional material is of the type indicated by the candidate object type.

In a second aspect of the present disclosure, there is provided a method of processing the image contents of a plurality of frames of a scene of a source video, the method comprising: receiving the plurality of frames of the scene of the source video; and processing, at least in part using machine learning, image contents of the plurality of frames to: identify a candidate insertion zone for the insertion of an object into the image content of at least some of the plurality of frames; and determine an insertion zone descriptor for the identified candidate insertion zone, the insertion zone descriptor comprising a candidate object type indicative of a type of object that is suitable for insertion into the candidate insertion zone.

In a third aspect of the present disclosure, there is provided a computer program for carrying out the method of the second aspect when executed on the processor of an electronic device.

In a fourth aspect of the present disclosure, there is provided an electronic device comprising: a memory for storing the computer program of the third aspect; and a processor for executing the computer program of the third aspect.

In a fifth aspect of the present disclosure, there is provided a method of training a candidate insertion zone module to identify candidate insertion zones and one or more candidate objects for insertion in a scene of a source video, the method comprising: receiving a training corpus comprising a plurality of images, each annotated with identification of at least one insertion zone and one or more candidate object types for each insertion zone; and training the candidate insertion zone module using machine learning and the training corpus to process image contents of a plurality of frames of the source video to: identify a candidate insertion zone for the insertion of an object into the image content of at least some of the plurality of frames; and determine an insertion zone descriptor for the identified candidate insertion zone, the insertion zone descriptor comprising one or more candidate object types indicative of one or more types of object that are suitable for insertion into the candidate insertion zone.

At least some of the plurality of images in the training corpus may be further annotated with a scene descriptor, and wherein the candidate insertion zone module may be further trained using machine learning to: identify at least one scene descriptor for the image content of at least some of the plurality of frames; and determine the one or more candidate object types based at least in part on the identified at least one scene descriptor.

The method of the fifth aspect may further comprise determining one or more scene descriptors for at least some of plurality of images in the training corpus using a trained machine learning module configured to identify a scene descriptor by processing the content of an image; wherein training the candidate insertion zone module using machine learning further comprises training the candidate insertion zone module to: identify at least one scene descriptor for the image content of at least some of the plurality of frames; and determine the one or more candidate object types based at least in part on the identified at least one scene descriptor.

Aspects of the Disclosure

Non-limiting aspects of the disclosure are set out in the following numbered clauses.

1. A system comprising:
    a candidate insertion zone module configured to:
    receive a plurality of frames of a scene of a source video; and
    process, at least in part using machine learning, image contents of the plurality of frames to:
    identify a candidate insertion zone for the insertion of an object into the image content of at least some of the plurality of frames; and
    determine an insertion zone descriptor for the identified candidate insertion zone, the insertion zone descriptor comprising one or more candidate object types indicative of one or more types of object that are recommended for insertion into the candidate insertion zone.
2. The system of clause 1, wherein the candidate insertion zone module further comprises:
    an insertion zone and insertion object identification sub-module configured to identify the candidate insertion zone and the candidate object types by processing, using machine learning, image contents of the plurality of frames to determine, for each of at least some of the pixels of the plurality of frames of the scene, an insertion probability vector comprising a probability value for each of a plurality of insertion labels, each probability value being indicative of the probability that the corresponding insertion label is applicable to the pixel.
3. The system of clause 2, wherein the plurality of insertion labels comprises:
    a label indicative of the pixel not being suitable for insertion of an object; and
    one or more labels indicative of a corresponding one or more types of object being suitable for insertion in the pixel.
4. The system of clause 2 or clause 3, wherein the candidate insertion zone comprises a plurality of pixels having insertion probability vectors that all have a maximum argument of probability values corresponding to a label that is indicative of the one or more candidate object types.
5. The system of clause 1, wherein the candidate insertion zone module further comprises:
    a scene descriptor sub-module configured to process, using machine learning, image contents of at least some of the plurality of frames to determine a scene descriptor;
    a database comprising a contextually indexed library of types of insertion object; and
    an identification sub-module configured to:
    receive the scene descriptor from the scene descriptor sub-module;
    identify, using machine learning, the candidate insertion zone using the scene descriptor; and
    determine, using machine learning, the candidate insertion object using at least the library of types of insertion object and the scene descriptor.
6. The system of clause 5, wherein the machine learning sub-module is further configured to:
    receive audio content relating to the scene of the source video; and determine the scene descriptor based at least in part on the received audio content.
7. The system of clause 5 or clause 6, wherein the scene descriptor comprises at least one global descriptor, wherein each global context descriptor is indicative of any one of:
Scene locale;
Mood;
Demographic;
Human Action;
Time of day;
Season of the year.
8. The system of any of clauses 5 to 7, wherein the scene descriptor comprises at least one regional context descriptor indicative of an identified entity in the scene.
9. The system of any of clauses 5 to 8, wherein the identification sub-module is configured to determine based on the scene descriptor and library of types of insertion object, for each of at least some of the pixels of the plurality of frames of the scene, an insertion probability vector comprising a probability value for each of a plurality of insertion labels, each probability value being indicative of the probability that the corresponding insertion label is applicable to the pixel.
10. The system of clause 9, wherein the plurality of insertion labels comprises:
a label indicative of the pixel not being suitable for insertion of an object; and
one or more labels indicative of a corresponding one or more types of object being suitable for insertion in the pixel.
11. The system of any preceding clause, wherein the candidate insertion zone module further comprises a post-processing sub-module configured to determine a time duration of the candidate insertion zone across the plurality of frames and/or a size of the candidate insertion zone.
12. The system of clause 11, wherein the insertion zone descriptor further comprises at least one of the time duration of the candidate insertion zone across the plurality of frames and/or the size of the candidate insertion zone.
13. The system of clause 11 or clause 12, wherein the post-processing sub-module is further configured to determine a Video Impact Score based at least in part on the time duration of the candidate insertion zone across the plurality of frames and/or a size of the candidate insertion zone.
14. The system of any preceding clause, further comprising:
a segmentation module configured to:
generate an insertion zone suggestion frame comprising a frame of the plurality of frames overlaid with a visualisation of the candidate insertion zone and at least one of the one or more candidate object types.
15. The system of any preceding clause, further comprising:
an object insertion module configured to:
select an object for insertion based on the one or more candidate object types; and
generate an object insertion suggestion frame comprising a frame of the plurality of frames and the selected object inserted in the candidate insertion zone.
16. A method of processing the image contents of a plurality of frames of a scene of a source video, the method comprising:
receiving the plurality of frames of the scene of the source video; and
processing, at least in part using machine learning, image contents of the plurality of frames to:
identify a candidate insertion zone for the insertion of an object into the image content of at least some of the plurality of frames; and
determine an insertion zone descriptor for the identified candidate insertion zone, the insertion zone descriptor comprising one or more candidate object types indicative of one or more types of object that are recommended for insertion into the candidate insertion zone.
17. A computer program for carrying out the method of clause 16 when executed on the processor of an electronic device.
18. An electronic device comprising:
a memory for storing the computer program of clause 17; and
a processor for executing the computer program of clause 17.
19. A method of training a candidate insertion zone module to identify candidate insertion zones and one or more candidate objects for insertion in a scene of a course video, the method comprising:
receiving a training corpus comprising a plurality of images, each annotated with identification of at least one insertion zone and one or more candidate object types for each insertion zone; and
training the candidate insertion zone module using machine learning and the training corpus to process image contents of a plurality of frames of the source video to:
identify a candidate insertion zone for the insertion of an object into the image content of at least some of the plurality of frames; and
determine an insertion zone descriptor for the identified candidate insertion zone, the insertion zone descriptor comprising one or more candidate object types indicative of one or more types of object that are recommended for insertion into the candidate insertion zone.
20. The method of clause 19, wherein at least some of the plurality of images in the training corpus are each further annotated with a scene descriptor, and wherein the candidate insertion zone module is further trained using machine learning to:
identify at least one scene descriptor for the image content of at least some of the plurality of frames; and
determine the one or more candidate object types based at least in part on the identified at least one scene descriptor.
21. The method of clause 19, further comprising:
determining one or more scene descriptors for at least some of plurality of images in the training corpus using a trained machine learning module configured to identify a scene descriptor by processing the content of an image; wherein
training the candidate insertion zone module using machine learning further comprises training the candidate insertion zone module to:
identify at least one scene descriptor for the image content of at least some of the plurality of frames; and
determine the one or more candidate object types based at least in part on the identified at least one scene descriptor.

DRAWINGS

Further features and advantages of the present disclosure will become apparent from the following description of an embodiment thereof, presented by way of example only, and by reference to the drawings, wherein like reference numerals refer to like parts, and wherein:

FIG. 3 shows an example list of types of object for insertion into a candidate insertion zone;

FIG. 4 shows an example insertion zone suggestion frame;

FIG. 5 shows an example objection insertion suggestion frame;

FIG. 7a shows example attributes that may be used to describe a detected "Human" more accurately;

FIG. 7b shows example attributes that may be used to describe a detected "Object" more accurately;

FIG. 7c shows example attributes that may be used to describe a detected "Surface" more accurately;

FIG. 7d shows example attributes that may be used to describe the "Locale" of a scene;

DETAILED DESCRIPTION

The present disclosure relates to a technique for using machine learning to identify insertion zones in a video scene and corresponding candidate types of object for insertion into the insertion zone. Candidate types of object are types of object that are suitable for insertion, and may be, for example, classes of object such as "soda bottle", "alcohol bottle", "vehicle", "cell phone", etc., or may be more specific, such as particular brands for particular objects.

Large-Scale Generation of Inventory of Insertion Opportunities

By using machine learning to process the image contents of a plurality of frames to identify a candidate insertion zone and a corresponding insertion zone descriptor comprising one or more candidate object types, the speed of identification of insertion zone opportunities and suitable objects for insertion may be significantly increased. In particular, an operator may straightforwardly review the candidate insertion zone and recommended types of object for insertion, without having to make any analysis of the contents of the scene themselves. The one or more insertion zone descriptors can very quickly give an indication of what sort of objects may be inserted into a scene (and optionally for how long they may be visible), at which point further investigation and/or object insertion may take place. For example, a source video may comprise eight different scenes, and one or more candidate insertion zones and corresponding descriptors may be returned for each. Thus, without any operator time or effort, it can very quickly be understood which scenes may be suitable for object insertion and what type of objects could be inserted into those scenes. Further processing and/or operator time may then be focussed only on those scenes that have the most promise (for example, where inserted objects will be visible for the longest and/or that are suitable for object types that are of particular interest, such as types of object that a director has indicated they would like to see inserted into the source video, etc). Consequently, the increasingly large volume of video content that is being generated may be assessed more rapidly and operator time focussed only on the most suitable scenes for object insertion.

Workflow

Figure 1:
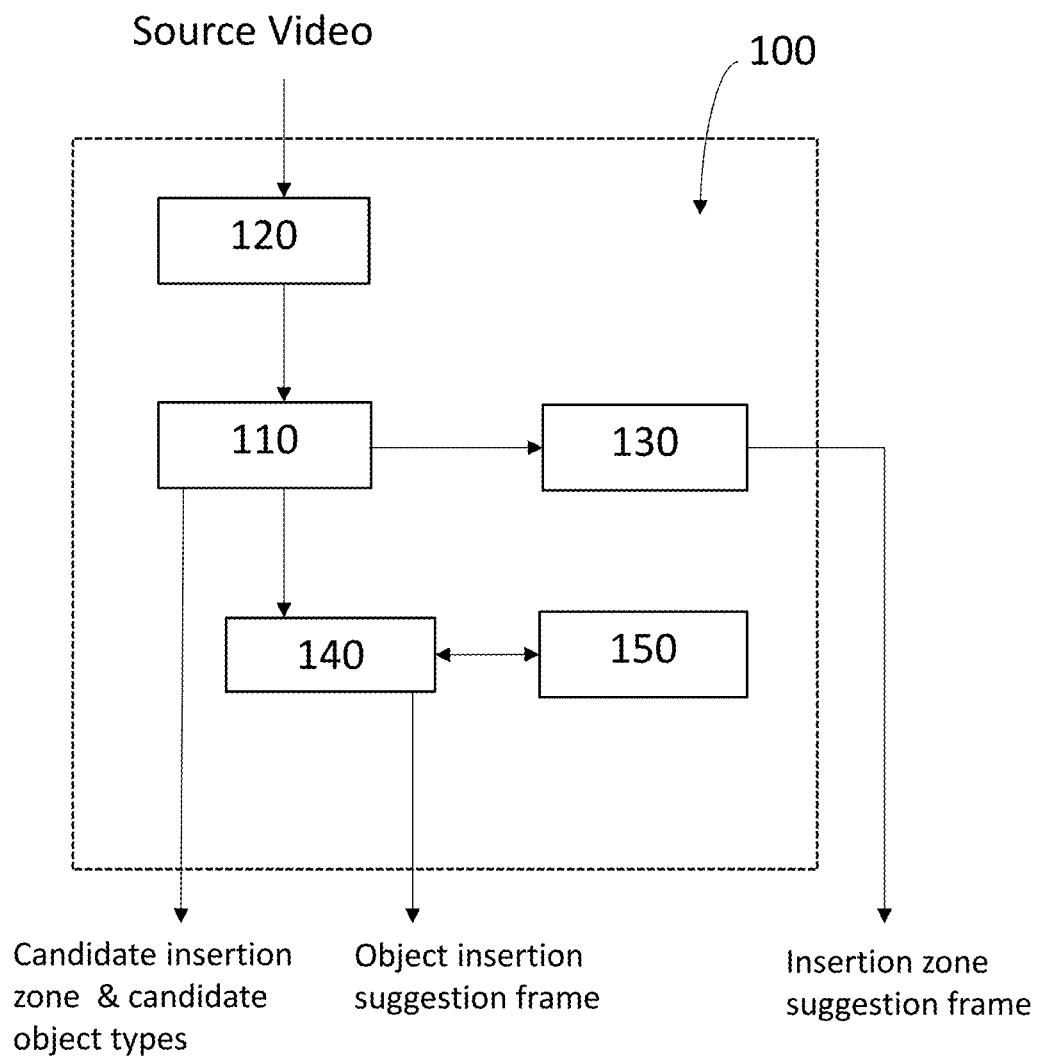
FIG. 1 shows an example schematic representation of a system in accordance with an aspect of the present disclosure.

FIG. 1 shows an example schematic representation of a system 100 in accordance with an aspect of the present disclosure. The system 100 comprises a candidate insertion zone module 110, a scene detection module 120, a segmentation module 130, an objection insertion module 140 and a database 150.

Figure 2:
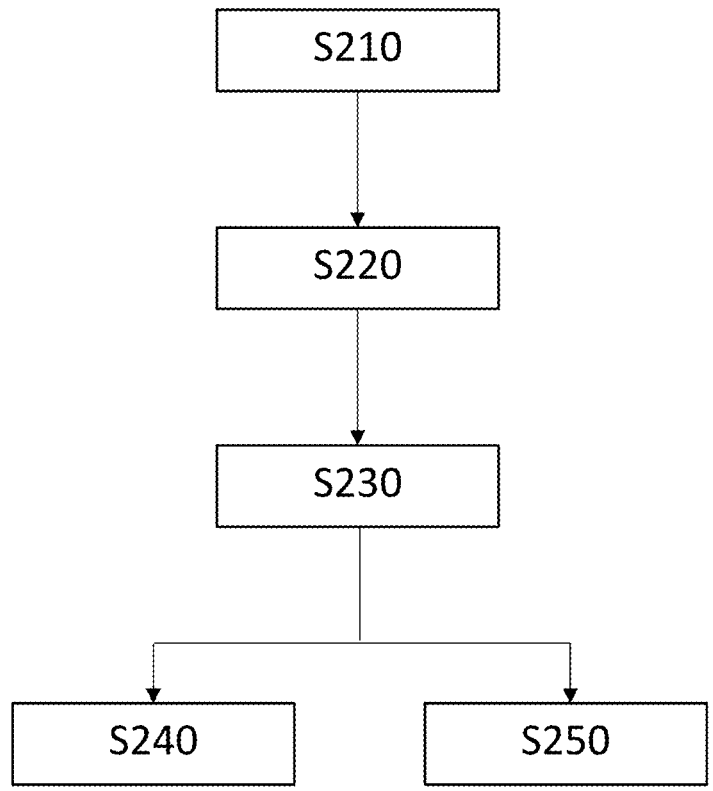
FIG. 2 shows an example process executed by the system of FIG. 1.

FIG. 2 shows an example process executed by the system 100 for identifying at least one insertion zone for a scene of the source video and determining a corresponding insertion zone descriptor.

In step S210, the scene detection module 120 obtains a source video. The source video may comprise one or more digital files and the scene detection module 120 may obtain the source video, for example, via a high speed computer network connection, the internet, or from computer readable hardware storage device. The source video comprises frames of video material, which may be grouped together into "shots" or "scenes" if recorded by the same camera or set in a particular location.

The scene detection module 120 may perform pre-analysis on the source video to create a sequence of similar shots or scenes which may be suitable for object insertion. The pre-analysis may be fully automated in that it does not involve any human intervention. Pre-analysis may comprise using a shot detection function to identify the boundaries between different shots in the source video. For example, the scene detection module 120 may automatically detect "hard" and "soft" cuts between different shots, which correspond to hard and soft transitions respectively. Hard cuts correspond to an abrupt change in visual similarity between two consecutive frames in the source video. Soft cuts correspond to the beginning or the end of a soft transition (for example wipe and cross fading transitions), which may be characterised by a significant but gradual change in visual appearance across several frames. Further pre-analysis techniques known in the art may be employed, such as continuity detection, point tracking or planar tracking, 3D tracking, autokeying, region segmentation etc.

In Step S220, the candidate insertion zone module 110 processes the contents of a plurality of frames of a scene identified by the scene detection module 120. It will be appreciated at this point that whilst the system 100 represented in FIG. 1 comprises the scene detection module 120, the scene detection module 120 is optional and in an alternative implementation the candidate insertion zone module 110 may receive a plurality of frames of a scene of the source video from an entity outside of the system 100, for example via a high speed computer network connection, the internet, or from computer readable hardware storage device.

The candidate insertion zone module 110 processes the contents of a plurality of frames of a scene of the source video to identify one or more candidate insertion zones in the image content of the frames. The content of all of the plurality of frames of a scene may be processed, or a subset of the plurality of frames (for example, processing speeds may be increased by analysing fewer than all of the plurality of frames, such as processing every second frame, or analysing the similarity of the frames to identify groups of similar frames within a scene and identifying only one, or some but not all, of the frames in each similar group, etc.). Each candidate insertion zone is suitable for the insertion of an object (or objects) into the image content of at least some of the plurality of frames of the scene. The candidate insertion zone module 110 also determines an insertion zone descriptor for each of the identified candidate insertion zones. Each insertion zone descriptor comprises one or more candidate object types indicative of one or more types of object that are suitable for insertion into the corresponding candidate insertion zone (for example, the candidate object types may be indicative of a recommendation, or suggestion, or prediction of one or more types of object for insertion into the corresponding candidate insertion zone). The insertion zone descriptor may also comprise further information indicative of the duration of the candidate insertion zone (for example, one or more of: the amount of time for which the candidate insertion zone is present during the scene, the size of the insertion zone, the centralness with respect to the image, etc.). Further details of different ways in which the candidate insertion zone module 110 may be configured to determine the insertion zone descriptor are explained later.

A candidate insertion zone is a region of the image content of a scene that is suitable for the insertion of an object. As explained earlier, a candidate insertion zone may correspond to a table in the image content of the scene, which may be suitable for the insertion of any type of object that might be placed on a table, for example a lamp or a bottle of soda. In an alternative, a candidate insertion zone may correspond to a wall, which may be suitable for the insertion of a poster. In an alternative, a candidate insertion zone may correspond to an object in the scene, for example a jar of coffee or a vehicle, which may be suitable for the insertion of a branding alteration object, in order to change the branding of the object in the scene.

As explained above, the insertion zone descriptor may comprise information indicative of the duration of the insertion zone. The duration of a candidate insertion zone is the time for which the candidate insertion zone is present within the scene. By way of non-limiting example, during a scene which lasts for 30 seconds, a character may open the door of a refrigerator, revealing a shelf within the refrigerator which may be identified as a candidate insertion zone. Five seconds later, the character may close the door of the refrigerator. In this particular example, the duration of the candidate insertion zone is five seconds, since it is visible within the scene for only five seconds. Information in the insertion zone descriptor may be indicative of the duration of the candidate insertion zone in any suitable way, for example by indicating the time for which the insertion zone is present within the scene in units of hours, and/or minutes, and/or seconds, and/or milliseconds, etc, or by indicating the number of frames of the scene in which the insertion zone is present (from which the time duration can be derived using the frame rate of the source video), etc.

The one or more candidate object types may take any suitable form, depending on the particular implementation of the candidate insertion zone module 110 and/or the requirements of the owner/operator of the system 100. For example, the one or more candidate object types may comprise particular categories of objects that may be inserted into the candidate insertion zone. An example list of 20 different categories of objects is given in FIG. 3, from which the one or more candidate object types may be selected (for example, the candidate insertion zone may be a counter in a kitchen and the one or more candidate object types may comprise "Food; Soft Drinks; Hot Beverages". The one or more candidate object types may additionally or alternatively be indicative of particular candidate objects for insertion, for example "Brand X Soda Can; Brand Y Coffee Bag; Brand Z Kettle; etc.).

Having identified the one or more candidate insertion zones and corresponding one or more insertion zone descriptors, in Step S230 the candidate insertion zone module 110 may output an identification of the candidate insertion zones and the one or more insertion zone descriptors from the system 100. Additionally, or alternatively, in Step S230, the candidate insertion zone module 110 may pass the identification of the one or more candidate insertion zones and insertion zone descriptors to the segmentation module 130 and/or objection insertion module 140.

In optional step S240, the segmentation module 130 selects a frame from the scene that includes the candidate insertion zone (for example, it may select any arbitrary frame that includes the candidate insertion zone, or the first frame in the scene that includes the candidate insertion zone, or the middle frame in the scene that includes the candidate insertion zone, or the last frame in the scene that includes the candidate insertion zone, etc.) and overlay a visualisation of the candidate insertion zone on the selected frame in order to create an insertion zone suggestion frame. Overlaying the visualisation of the candidate insertion zone may be performed, for example, based on pixel labelling, wherein the candidate insertion zone module 110 has labelled the pixels in the frames of the scene to identify each pixel as being part of a candidate insertion zone or not, such that the segmentation module may readily identify the boundaries of any candidate insertion zones. The insertion zone suggestion frame may also comprise a visualisation of the one or more candidate object types (for example, text overlaid on the frame identifying the one or more candidate object types) and/or a visualisation of any of the other information in the insertion zone descriptor, such as text overlaid on the frame identifying the amount of time and/or number of frames for which the candidate insertion zone is present in the scene). The overlay visualisation of a candidate insertion zone may take the form of a coloured area on the image content of a frame of the scene, the boundaries of which correspond with the boundaries of the candidate insertion zone.

FIG. 4 shows an example frame from a scene 410 and an example insertion zone suggestion frame 420, which is the same as the example frame from the scene 410 but with a visualisation of a candidate insertion zone 425 overlaid on the scene. As will be appreciated, the insertion zone suggestion frame 420 may help an operator to quickly understand the characteristics and possibilities of the candidate insertion zone 425, for example how prominent it may be within the scene, what sort of objects may be suitable for insertion and/or how long those objects may be visible within the scene, etc. Consequently, the speed with which an assessment of the potential value of the candidate insertion zone and subsequent object insertion may be considerably increased, since a source video or a scene of a source video may be input to the system 100 and a readily intelligible representation of a candidate insertion zone(s) and object insertion opportunities within that candidate insertion zone(s) quickly output from the system 100.

In optional step S250, the object insertion module 140 performs a similar operation to the segmentation module 130, except that rather than generate an insertion zone suggestion frame 420, it generates an object insertion suggestion frame. This may be much the same as the insertion zone suggestion frame 420, but rather than overlay a visualisation of the candidate insertion zone, the object insertion suggestion frame may comprise a frame of the scene with an object inserted into the candidate insertion zone. In this way, a mock-up of the insertion opportunity may be created.

To this end, the object insertion module 140 may be configured to select an object for insertion from the database 150, which may comprise a library of graphics of objects for insertion, based on the one or more candidate object types, and insert the selected object into the frame. The library of graphics of objects may be indexed by object type so that the object to be inserted may be any object that matches the one or more candidate object types in the insertion zone descriptor (for example, if the insertion zone descriptor identifies "Drink, Soft Drinks" as a candidate object type, any type of soft drink object in the database 150 may be selected and inserted into the frame to create the object insertion suggestion frame). Optionally, the object insertion module 140 may generate a plurality of different object insertion suggestion frames, each comprising a different object, such that the visual appearance of different objects inserted into the scene may be readily appreciated. Further optionally, rather than inserting a full representation of the object, the object insertion module 140 may insert a shape (for example, a coloured box or cylinder, etc) that approximately matches the shape of a generic object that matches the candidate object type. This may help with visualising how the scene may appear after object insertion, without being limited to a specific object that is within the candidate object type.

FIG. 5 shows an example frame from a scene 510 and an example object insertion suggestion frame 520, which is the same as the example frame from the scene 510 but with a suggested object 525 inserted into the scene. Optionally, the object insertion suggestion frame 520—may also comprise a visualisation of any other information in the insertion zone descriptor (for example, text overlaid on the frame identifying the amount of time and/or number of frames for which the candidate insertion zone is present in the scene). It will be appreciated that the object insertion suggestion frame 525 may help in the rapid visualisation of how the scene might appear with a suitable object inserted into it. Furthermore, if a determination is made to insert the object into the scene, it may help to speed up the process of insertion, since the operator can very quickly understand how and where the object can be inserted.

Based on the candidate insertion zone(s) and candidate object types(s), and/or the object insertion suggestion frame and/or the insertion zone suggestion frame, one or more objects corresponding to the type of object(s) indicated by the candidate object type may be inserted into the scene of the source video, such that they appear within the image content of the frames of the scene. For example, an operator may decide whether or not to proceed with the insertion based on the candidate insertion zone(s) and candidate object types(s), and/or the object insertion suggestion frame and/or the insertion zone suggestion frame. If they decide to proceed, an object(s) can be inserted according to any standard techniques well understood by the skilled person. If they decide not to proceed, nothing further may happen. Alternatively, insertion of an object(s) of the type indicated by the candidate object type(s) may automatically take place after the candidate insertion zone(s) and candidate object types(s) have been determined.

The candidate insertion zone module 110 uses machine learning techniques to perform at least some of the steps necessary to process the image contents of the plurality of frames of a scene to identify at least one candidate insertion zone in the scene and a corresponding at least one insertion zone descriptor. There are a number of different ways in which the candidate insertion zone module 110 may be configured to use machine learning to this end, which are summarised below as an "indirect approach" or a "direct approach". Example configurations of the candidate insertion zone module 110 in accordance with each of the "indirect approach" and the "direct approach" are described below with reference to FIGS. 6 and 9.

Indirect Approach

Figure 6:
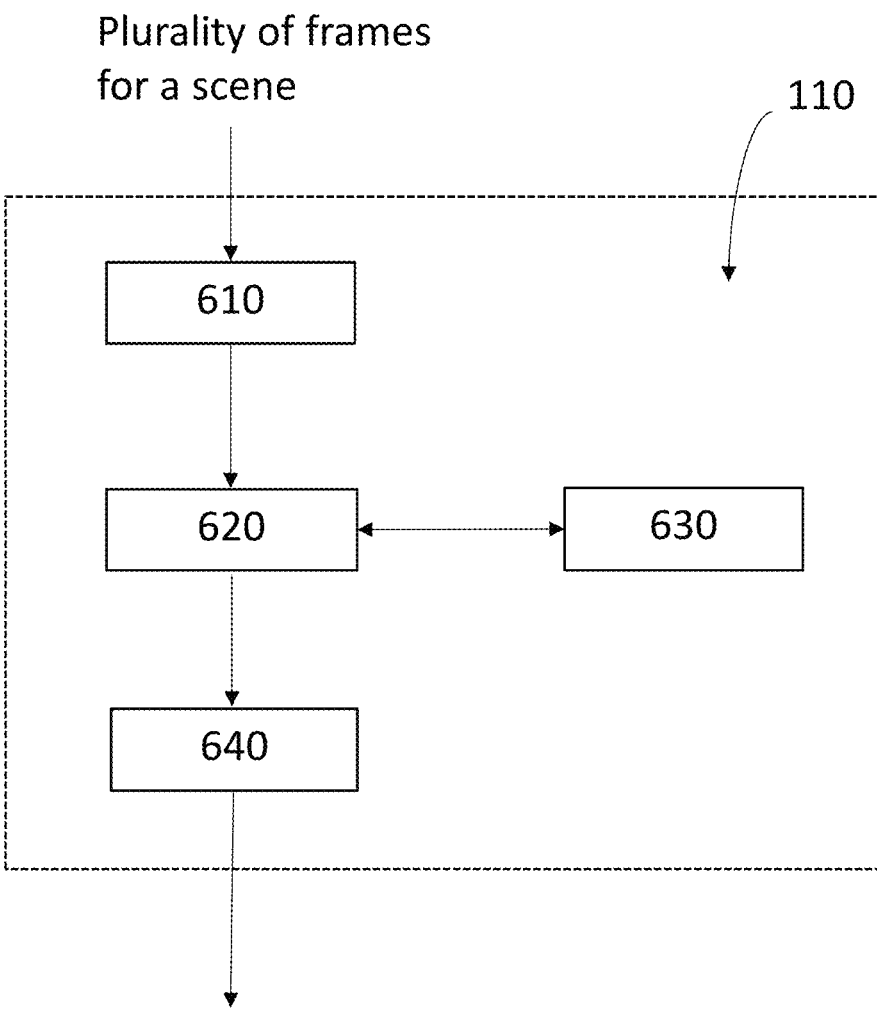
FIG. 6 shows a first example schematic representation of a configuration of the candidate insertion zone module of the system of FIG. 1.

FIG. 6 shows an example schematic representation of a configuration of the candidate insertion zone module 110 for carrying out the "indirect approach" of identifying a candidate insertion zone and determining an insertion zone descriptor. The candidate insertion zone module 110 comprises a scene descriptor sub-module 610, an identification sub-module 620, a database 630 comprising a library of types of insertion object and a post processing sub-module 640. The database 630 may be the same as database 150, or it may form part of database 150 (or database 150 may form part of database 630), or may be completely separate from database 150.

Regional Context Descriptor

The scene descriptor sub-module 610 is configured to process the image content of a plurality of frames of the scene using machine learning to determine scene descriptors. The scene descriptors may comprise at least one regional context descriptor and/or at least one global context descriptor.

A regional context descriptor may be indicative of what type of "thing" a part of the image content of the plurality of frames is. For example, an identified part within the image may be classified semantically into any one of four classifications of regional context descriptor: (1) Human, (2) Animal, (3) Surface, (4) Object. Where a part of an image has been identified as being part of one of the four classifications of regional context descriptor, that part of the image may be characterised more precisely using attributes associated with that classification of regional context descriptor.

FIG. 7a, for example, shows attributes that may be used to describe a detected "Human" more accurately. In this particular example, a "Human" may be described more accurately with two different types of attribute: Gender and Age. However, it will be appreciated that any number of other types of attribute may additionally or alternatively be used, for example: ethnicity, hair colour, etc. Additionally, or alternatively, attributes may identify particular actors or characters so that they may be tracked throughout shots of a sequence. For this purpose, one of a large number of readily available facial recognition packages may be used to identify the characters and/or actors, using Fisher vectors, for example. Fisher vectors are described in K. Simonyan, A. Vedaldi, A. Zisserman. "*Deep Fisher networks for large-scale image classification*" *Proc. NIPS,* 2013.

FIG. 7b, for example, shows attributes that may be used to describe a detected "Object" more accurately. Again, these attributes are shown only by way of non-limiting example and any other suitable "Object" attributes may additionally or alternatively be used. Furthermore, whilst in this example an identified "Object" is described with only one type of Object attribute, it may alternatively be described using two or more different types of attribute, for example: the category of the object (such as drinks can, magazine, car, etc) and the brand of the object.

FIG. 7c, for example, shows attributes that may be used to describe a detected "Surface" more accurately. Again, these attributes are shown only by way of non-limiting example and any other suitable "Surface" attributes may additionally or alternatively be used. Furthermore, whilst in this example an identified "Surface" is described with only one type of "Surface" attribute, it may alternatively be described using two or more different types of "Surface" attribute.

Pixel Labelling for Determining Regional Context Descriptors

The machine learning sub-module 610 may be configured to determine the one or more regional context descriptors in any suitable way. In one particular example, it may be configured to annotate each of at least some of the pixels of a plurality of frames of the scene (or each of at least some of the pixels in a plurality of frames of the scene, as explained in more detail later), with a regional context probability vector. Whilst it may be preferable for each of at least some of the pixels to be annotated with a regional context probability vector for reasons of resolution, in an alternative implementation each regional context probability vector may relate to a group of two or more pixels. For example, the pixels making up a frame may be grouped into a series of sub-sets, each sub-set comprising two or more pixels. In this case, each sub-set may be annotated with a regional context probability vector. Consequently, the machine learning sub-module 610 may be configured to annotate at least some of the pixels (either individually or in sub-set groups) with regional context probability vectors. The regional context probability vector may comprise a probability value for each of a plurality of regional context labels, each probability value being indicative of the likelihood that the type of entity indicated by the corresponding regional context label is applicable to that pixel(s) (for example, the values in the regional context probability vector may be indicative of a relative 'scoring' of each of the labels, representing the relative likelihood of each of the labels being applicable to that pixel(s)). A non-limiting example of a regional context probability vector for a pixel is as follows:

$$c = [0.1, 0.05, 0, 0.05, 0, 0.05, 0.05, 0.05, 0.4, 0.15, 0.1]$$

Each of the items in the vector c corresponds to a regional context label, wherein each regional context entity is indicative of a different type of entity. In this particular example, the regional context labels are:

Not a 'thing', Male aged under 45, Male aged over 45, Female aged under 45, Female aged over 45, Animal, Table Top, Kitchen Counter top, Vehicle, Computer, Book Thus, each of the regional context labels for the pixel in this example have the following probability values:
Not a 'thing'=0.1
Male aged under 45=0.05
Male aged over 45=0
Female aged under 45=0.05
Female aged over 45=0
Animal=0.05
Table top=0.05
Kitchen Counter top=0.05
Vehicle=0.4
Computer=0.15
Book=0.1

Thus, it can be seen that there are four labels relating to the "Human" classification (each label being an attribute relating to Humans), one label relating to the "Animal" classification, two labels relating to the "Surface" classification (each label being an attribute relating to Surfaces) and three labels relating to the "Object" classification (each label being an attribute relating to Objects).

The "Not a 'thing'" label indicates the likelihood that the pixel does not belong to any of the other regional context labels, i.e., the pixel(s) does not relate to anything. The probability of the "Not a 'thing'" label may be set to: 1 minus the sum of all of the other probabilities in the regional context vector. Consequently, the sum of all probabilities in the regional context probability vector should be 1.

Therefore, in this example, the regional context label having a probability with the greatest argument (i.e., the highest probability) is 'Vehicle'. Thus, the regional context label considered to be most likely applicable to the pixel(s) is 'Vehicle' (i.e., that pixel(s) is thought most likely to be part of a vehicle).

Whilst each of the probabilities in the regional context probability vector in this particular example are between 0-1, with higher values indicating greater likelihood, it will be appreciated that the regional context probability vector may take any other suitable form that is indicative of the likelihood that the type of entity indicated by the corresponding regional context label is applicable to a pixel(s). For example, a regional context probability vector may comprise probability values between 0-20, or between 10-20, or between 0-100, etc, wherein each value is indicative of the relative likelihood that the type of entity indicated by the corresponding regional context label is applicable to a pixel(s). It can therefore also be seen that the probabilities need not necessarily sum to 1, but may alternatively sum to any other suitable value.

Whilst in the above there is one particular example of a regional context probability vector, it will be appreciated that the machine learning sub-module 610 may be configured to determine regional context probability vectors comprising any number of probability values corresponding to regional context labels, for example 100s or 1000s of probability values corresponding to 100s or 1000s of regional context labels.

By determining regional context probability vectors for pixels in the frames, an understanding of what 'things' are in the image content of a frame, and their relative positioning, may be reached. For example, a region of the frame where all the pixels are annotated with regional context probability vectors with maximum arguments of probability values corresponding to 'Animal' is likely to have an animal. A different region of the frame where all the pixels have regional context probability vectors with maximum arguments corresponding to 'Table top' is likely to have a table top. Because the positioning of each pixel in the frame is known, the proximity of the animal and table top may also be known. Thus, it can be said that the image contents of the frame includes a table top and an animal and their proximity to each other is perceptible.

It will be appreciated that not only can the regional context probability vectors be used to identify what 'things' are in the image content of a frame and their proximity to each other, it may be used to determine how many 'things' are within the image content of the frame. For example, the total number of 'things' of any type may be determined and/or the total number of each different type of 'thing' may be determined (for example, number of humans, number of animal, number of soda cans, etc, etc). This may be useful for a number of purposes, such as determination of a global context descriptor and/or determination of candidate object types (as explained in more detail later).

Furthermore, pixels that are identified by the regional context probability vectors as being part of a surface may be indicative of a candidate insertion zone. Likewise, pixels identified by the regional context probability vectors as being part of an object may also be indicative of a candidate insertion zone (since the branding of the identified object, for example, may be changed by object insertion). Thus, the regional context probability vectors may not only provide further information about the 'things' within an image content, but may also be used to identify potential insertion zones and their proximity to other 'things' identified in the image content.

Global Context Descriptor

A global context descriptor is indicative of an overall context of the image contents of the plurality of frames. One or more different global context descriptors may be determined by the machine learning sub-module, each corresponding to a different global context classification. Non-limiting examples of global context classifications are: Locale, Human Action, Demographics, Mood, Time of Day, Season of the Year (for example, spring, summer, autumn, winter), weather, filming location, etc, etc.

FIG. 7d, for example, shows a set of attributes that may be used to describe the Locale of a scene. In this example, 41 different types of locale are listed, although it will be appreciated that the scene descriptor sub-module 610 may be configured to determine a locale context descriptor for a scene from a list of any number of different locale attributes. Furthermore, whilst the list in FIG. 7d identifies generic locale attributes, more specific locale attributes may additionally or alternatively be used, for example particular rooms or places that regularly occur within a film or television series may be locale attributes, such as a particular character's bedroom, or a particular family's kitchen, etc.

The scene descriptor sub-module 610 may determine at least one global context descriptor using machine learning in any suitable way. In one example, for at least one frame of a scene, the scene descriptor sub-module 610 may use machine learning to determine at least one global context probability vector. Each global context probability vector for a frame may correspond to a different classification of global context descriptor (for example, Locale, Mood, etc) and may comprise a plurality of probabilities, each corresponding to a different global context label (each global context label being an attribute for the particular classification of global context descriptor). Based on the example represented in FIG. 7d, a global context probability vector corresponding to the "Locale" classification may comprise 41 probability values corresponding to the 41 different attributes listed in FIG. 7d. The probability values in the global context probability vector are indicative of the likelihood that the different listed attributes are applicable to the scene. Each probability value may be between 0-1, or may take any other suitable form indicative of relative likelihood, for example values between 0-20, or between 10-20, or between 0-100, etc. The probabilities in each global context probability vector may optionally sum to 1, or any other suitable value. The attribute with the largest corresponding probability argument for each global context probability vector may then be considered to be the attribute that best describes the global context of the scene. For example, if for a global context probability vector relating to Locale the maximum probability argument corresponds to the attribute "Outdoor Day urban street", the global context descriptor may comprise "Locale{ Outdoor Day urban street}". If a global context probability vector relating to Mood the maximum probability argument corresponds to the attribute "Happy", the global context descriptor may also comprise "Mood{Happy}", etc. Thus, the global context descriptor may comprise one or more global context probability vectors and/or one or more chosen attributes for each type of global context (for example, Locale{Outdoor Day urban street}, Mood{Happy}, etc).

The global context descriptors may be determined using machine learning by directly determining them from processing the image content of a plurality of frames, or by deriving them from the regional context descriptors. For example, it may be possible to infer suitable attributes for one or more global context descriptors based on the one or more regional context descriptors for the image contents of a frame. By way of example, if we consider the following attributes identified for the regional context classifications "Object", "Surface" and "Human" in the image content of a frame:

Object {sink, bottle, cereal box}
Surface {table, counter top, wall}
Human {woman, widow} it may be inferred that a suitable attribute for the global context classification "Locale" is "kitchen". Likewise, by way of a further example, if regional context descriptor attributes such as road and bench are determined, it may be inferred that a suitable attribute for the global context classification "Locale" is "outdoors". The number of objects identified within the image content of the frame, particularly the number of particular types of objects, may also be indicative of particular global context attributes.

In addition to processing the image content of a plurality of frames in order to determine the scene descriptors, the machine learning sub-module 610 may optionally also process audio data corresponding to the frames. This may improve the reliability of determination. For example, gunshots are normally perceived as being bad, and so may provide strong cues to the attributes of the Human Action and/or Mood classifications of global context descriptors. Likewise, laughter may provide a cue to the happiness attribute of the Mood classification of global context descriptors, shouting may provide a cue to the excitement attribute of the Mood classification of global context descriptors, etc.

The scene descriptors are passed to the identification sub-module 620, which uses machine learning to identify one or more candidate insertion zones in the image contents based on the scene descriptors and determine an insertion descriptor for each. They may be passed to the identification sub-module 620 in the form of an annotated plurality of frames that are annotated with the regional context probability vectors and/or global context probability vectors described above, and/or annotated with the most relevant scene descriptor(s) for the scene (for example, the chosen global context attribute for each type of global context, etc).

As explained earlier, the regional context probability vectors may be indicative of parts of the image contents that could be insertion zones, for example regions that relate to a "Surface" or "Object". Through machine learning, the identification sub-module 620 may be able to identify which of these regions are most suitable to be candidate insertion zones (for example, based on their size, positioning in the frame, positioning relative to other 'things' in the frame identified by the regional context descriptors, etc.).

Demographics Context Descriptor

The identification sub-module 620 may also determine one or more candidate object types for the insertion zone descriptor for each candidate insertion zone. This may be determined, for example, based at least on the scene descriptors and a library of types of insertion object stored in the database 630 that are contextually indexed object types.

Thus, the candidate object types may be determined in a way that is most suitable for the scene based on global context properties and/or regional context properties for the scene.

By way of example, the people appearing in the scene may be useful in determining a suitable candidate object type for the scene. This may be because insertion objects often relate in some way to people, such that some insertion objects may look natural in proximity to some types of people, but look unnatural in proximity to other types of people. For example, the general perception may be that children are more interested in toys and adults more interested in clothes or home appliances. Therefore, if the scene descriptor includes a regional context descriptor in the Human classification that identifies the attribute "child", it may be more appropriate to recommend toys for insertion into the image contents of the frames. Consequently, the identification sub-module 620 may learn through machine learning that candidate object types that are indexed in the library with the context of children should be suitable for insertion in this scene.

To consider another example, a manufacturer of soft drinks may have a range of different brands that are marketed to different categories of consumer. It is generally known that diet or light drinks tend to be marketed more heavily towards women. The identification sub-module 620 may recognise through machine learning that the candidate insertion zone and the regional context descriptors and/or global context descriptors suggest that the insertion of a soft drink might be appropriate. For example, the scene descriptors include a Locale descriptor of "kitchen", a Surface of "refrigerator shelf" and an Object of "soft drinks" near the candidate insertion zone in the refrigerator, in which case the identification sub-module 620 may perform a search of the contextually indexed library in the database 630 and identify that the insertion of a soft drink may be appropriate (candidate object type="soft drinks"). This may be a very useful recommendation for object insertion. However, if the scene descriptor also identifies that the scene includes a woman, the search of the contextually indexed library may more specifically identify a particular brand(s) of soft drinks that tend to be marketed more heavily towards women, in which case the candidate object type may be set to that particular brand(s). In this case, the candidate object type is more specific and may therefore be more helpful for subsequent analysis and/or object insertion.

It may be appreciated, therefore, that scene descriptors may be correlated with different types of object and machine learning may be used to learn these correlations. For example, the links between the detected instances of regional context descriptors of Locale{bedroom}, Human{child}, and Surface{floor} is likely to mean that an insertion object type of "toys/games" would be appropriate. An insertion object type of "DIY furnishing accessories" or "spirits/liqueurs" is unlikely to be appropriate.

Insertion Probability Vector

The identification sub-module 620 may annotate each pixel in a plurality of frames of a scene with an insertion probability vector a. The insertion probability vector a may be very similar to the regional context probability vector c described above, in that it may have a plurality of probability values, with all but one of which corresponding to an object type. The remaining one probability value may correspond to a label of "not suitable for object insertion". Each of the probability values are indicative of the likelihood that the type of insertion indicated by the corresponding insertion label is applicable to the pixel (for example, the values in the insertion probability vector may be indicative of a relative 'scoring' of each of the labels, representing the relative likelihood of each of the labels being applicable to that pixel).

Whilst it may be preferable for each of at least some of the pixels to be annotated with an insertion probability vector for reasons of resolution, in an alternative each insertion probability vector may relate to a group of two or more pixels. For example, the pixels making up a frame may be grouped into a series of sub-sets, each sub-set comprising two or more pixels. In this case, each sub-set may be annotated with an insertion probability vector. Consequently, the identification sub-module 620 may be configured to annotate at least some of the pixels (either individually or in sub-set groups) with insertion probability vectors.

The probability values in the insertion probability vector may take any suitable form. For example, they may each be a value between 0-1, 0-10, or 20-40, or 0-200, etc, etc, with higher values indicating greater likelihood. The sum of the probabilities in the insertion probability vector a may total 1, or may total any other suitable value. If the insertion probability vector is configured to have probability values that sum to 1, the value corresponding to "not suitable for object insertion" may be set to 1 minus the sum of all of the other probability values. This annotation may be added to the annotated version of the plurality of frames earlier received from the scene descriptor sub-module 610 (such that the plurality of frames includes scene descriptor and insertion descriptor annotations), or may be added to a 'fresh' version of the frames (such that the plurality of frames includes only insertion descriptor annotations). The annotated frames therefore indicate the candidate insertion zone within the image content of the frames and also the corresponding one or more candidate object types.

Thus, a candidate insertion zone may be identified by virtue of an area within the image contents of the frame that comprises a plurality of pixels having insertion probability vectors all having a maximum argument of probability values corresponding to a label that is indicative of a particular object type. That particular object type is the candidate object type for that candidate insertion zone.

Modelling the Visual Impact Score

The post processing sub-module 640 may receive the annotated plurality of frames in order to identify groupings of pixels that are annotated with insertion probability vectors where the maximum arguments of the vectors all correspond to the same label (i.e., to the same candidate object type). It may also determine the size, location and/or duration of the candidate insertion zone in the same way. The post processing sub-module 640 may thus output from the candidate insertion zone module 120 an indication of the one or more candidate object types for the identified insertion zone and any other insertion zone descriptor information it has determined (for example, the size, location and/or duration of the insertion zone).

Optionally, the post-processing module 640 may also be configured to determine a Video Impact Score (VIS) for one or more of the identified candidate insertion zones. The VIS may be included as one of the insertion zone descriptors and may be used to assess an insertion zone's potential impact on viewers of the video. The VIS may be a multiplier to the quality score of an object insertion opportunity value to account for the highly variable nature of object embedding into video content. VIS may take any suitable form, for example a number lying on a scale, such as a number between 0 and approximately 2 (although the scale may be of any size and granularity). In reality, VIS may not be allowed to be less than 1 and is generally between 1 and 2.

The VIS for a candidate insertion zone may be calculated based on at least part of the insertion zone descriptor for the insertion zone, for example based on the duration of the candidate insertion zone and/or the size of the candidate insertion zone.

One non-limiting example technique for determining VIS is identified below. In this example, the VIS is based on combining an Exposure Score and a Context Score (although any other suitable function for determining the VIS using any one or more insertion zone descriptor items). These two scores are a weighted combination of a number of parameters including Brand relevance, Duration, Hero Status, Proximity, Amplification, as defined below.
Consider the following:

Calculating Video Impact $Score BETA$ $VIS = ES + CS$ $ES$ = Exposure Score $CS$ = Context Score Calculating Exposure Score $ES = W_D f(D) + W_s f(S) + W_A A$ $D$ = Quailfying Exposure Duration $S$ = Average Exposure Size $A = \text{Amplification} = \begin{cases} 0, & |\text{amplified} \\ 1, & \text{amplified} \end{cases}$ $f(D)$ = Duration valuation function $f(S)$ = Size valuation function $W$ = Weight The Context Score (CS) is a weighted combination of metrics specific to embedding objects (particularly branded objects) into video content, focused on providing a valuation depending on the fit between the object (or brand) and the content.

The CS may be between 0 and approximately 2 (although the scale may be of any size and granularity).

The primary term for determining the CS may be the Brand Relevance, which is used to determine whether the brand fits the context (e.g. Vodka in a bar). If there is no Brand Relevance, then the score is 0, and the CS will be 0. When we have Brand Relevance, the Context Score is 1 or above, with the rest of the terms supplying boosts in value.

The Context Score may be carried out as follows, although it will be appreciated that where CS is used to determine the VIS, CS may be determined in any other suitable way (for example, using only one or more of B, H and P identified below):

$CS = \begin{cases} 0, & B = 0 \\ B + W_H H + W_P P, & B = 1 \end{cases}$ $B = \text{Brand Relevance} = \begin{cases} 0, & |\text{match} \\ 1, & \text{match} \end{cases}$ $H = \text{Hero Status} = \begin{cases} 0, & |\text{match} \\ 1, & \text{match} \end{cases}$ $P = \text{Proximity} = \begin{cases} 0, & |\text{touching} \\ 1, & \text{touching} \end{cases}$ Thus, it will be appreciated that a VIS may be determined for a candidate insertion zone in a new video based on at least some insertion zone descriptors. The VIS for a candidate insertion zone may be a useful technique for ranking candidate insertion zones, or filtering poorer candidate insertion zones such that the number of candidate insertion zones for a new video that meet a particular video impact requirement (for example, that have a VIS greater than a threshold value) may be readily identified and the potential suitability for object insertion opportunities for the new video straightforwardly appreciated.

In an alternative, the post-processing module may not be used, and the identification sub-module 620 may simply output the annotated frames, so that any other modules or sub-modules within the system 100 (for example, the object insertion module 140), or external to the system 100, may process the annotations to recognise the candidate insertion zones and the corresponding insertion zone descriptors.

Modelling the Indirect Approach

Before the "direct approach" is described, it is worth considering some further details of how the scene descriptor sub-module 610 and the identification sub-module 620 may be implemented to carry out machine learning and in particular how they may be trained. Preferably, in the "indirect approach", we will use Convolutional Neural Networks (CNN) for the recognition of scene descriptors and Support Vector Machines (SVM) for the recognition of insertion descriptors.

The Convolution Neural Network: A Bioinspired Mathematical Model

CNNs may be used for the recognition of the different scene descriptors. A CNN is a network of learning units, so-called neurons. A CNN is used to sequentially transform the initial image contents of video frame into an interpretable feature map that summarises the image.

The CNN is biologically inspired from the feed-forward processing of the visual information and from the layered organisation of neurons in the visual cortex. Like the different areas of the visual cortex, neurons in a CNN are grouped into layers, each neuron within the same layer performing the same mathematical operation.

Typically a layer in a CNN can perform either (1) a convolutional operation, or (2) an activation operation, or (3) pooling operation or (4) an inner product operation. The first layers of a CNN perform convolutional operations on the image with a bank 2D of convolution filters. They loosely model the behaviour of retinal cells in the area V1 of the visual cortex in the sense that They behave like Gabor filters and subsequently forwards signals into deeper areas of the visual cortex. A convolution filter also models the fact that adjacent retinal cells have overlapping receptive fields and respond similarly to an identical visual stimulus.

Then like the V2 area and other areas of the visual cortex, subsequent layers of the CNN build higher-level features by combining lower-level features. However caution is required in pursuing the analogy because artificial neural networks do not exactly replicate the biological processes of learning visual concepts.

In more detail, the scene descriptor sub-module 610 may need to be trained (1) to determine a global scene descriptor and (2) to determine regional context descriptors via pixel labelling. In order to do this, the existing corpus of video material used for training should be annotated in a similar way. In order to explain the process of training in more detail, it may be helpful first to introduce some definitions.

Definitions

A CNN operates on tensors. By definition a tensor is a multidimensional array and is used to store and represent image data and the intermediate data transformations of the CNN, often called feature maps.

Thus an image can be represented as a 3D tensor $$x \in \mathbb{R}^{C \times H \times W}$$

where C, H, W respectively denote the number of image of channels, the image height and the image width. The RGB colour value of pixel is the 3D vector.

$$\begin{bmatrix} x[1, i, j] \\ x[2, i, j] \\ x[3, i, j] \end{bmatrix}$$

The output of a CNN depends on the visual recognition tasks. Let us provide some output examples.

In the image classification task, e.g., of determining the "Locale" global context descriptor for a given image x, the final output of a CNN is a probability vector $$y = CNN(x)$$

where the k-th coefficient [k] quantifies the probability that an image corresponds to class k, say a "Kitchen" locale and the best "Locale" descriptor for the image x is determined as $$k^* = \mathrm{argmax}_k y[k]$$

In the image segmentation task, e.g., of determining the regional context descriptor, the final output of a CNN is a 3D tensor of probability vectors where each coefficient quantifies the probability that an image pixel (i,j) corresponds to class k, say a 'Table' pixel. Thus, the best pixel labelling is determined as the tensor defined by $$k^*[i, j] = \mathrm{argmax}_k y[k, i, j].$$

The dimensionality of tensors does not really matter as layers can operate on tensors of any dimension. When dealing with video data as input, CNNs are sometimes called video networks in the computer vision literature. In practice, it is sufficient and computationally more efficient to just use image data and exploit temporal coherence by using a Long-Short-Term-Memory (LSTM) networks. In particular they are designed to deal with an infinite sequence of data.

Besides, in practice, it is more efficient to feed images by batch to a CNN than feeding one image by one. A batch of N images can be represented by a 4D tensor $$x \in \mathbb{R}^{N \times C \times H \times W}$$

For video data, a batch of videos are 5D tensors $$x \in \mathbb{R}^{N \times T \times C \times H \times W}.$$

In the sequel we restrict the description to image data and we leave the reader the exercise of generalising subsequent definitions to video data. As presented above a CNN is composed of interconnected layers. A layer is a differentiable function. The differentiability is a central property in CNN as it is a necessary condition to back propagate the gradients during the training stage.

As another analogy to physics, a CNN can be thought an electric network where tensors can be thought as input or output electric signals and a layer is an electric component that filters the incoming electric signals from incident layers.

Definition 1 We define a Convolutional Neural Network (CNN) as a directed acyclic graph G=(V,E) where each node v E V is a layer.

Classical CNNs that are successful in image classification tasks are typically a chain of layers. Let us define the convolutional layer which is the most important layer used in a CNN.

Definition 2 Let k be a tensor kernel in $R^{N \times C' \times H'' \times W''}$. The convolutional layer with k is defined as the function that transforms an input tensor $x \in R^{N' \times C' \times H' \times W'}$ (e.g. an image) into a tensor $x*k \in R^{N \times N' \times H'' \times W''}$ $$(x * h)[n, n', i, j] = \sum_{c', i', j'} x[n, c' - c, i' - i, j' - j] \times k[n', c', i', j']$$

In words, the tensor kernel k encodes N convolutional kernel filters (i.e., N convolutional neurons) and, as an abusive simplification, convolutional layer can be as a kind of local averaging operation applied on all image patches of size C×H×W of each image x[n., . , . ]. Each feature vector y[n, ., i, j] is a vector of dimension N' that describes the pixel x[n.,i,j] of the n-th image x[n., ., .].

In the sequel, the n-th image is also denoted by $x_n \in R^{C \times H \times W}$ to alleviate the notation. An important observation is that a convolutional operation is equivalent as a simple matrix-matrix product operation, which is how popular deep learning packages implement it. Specifically, 1. by forming a matrix φ(x) of shape HW×C'H'W' where each row Wi+j encodes an image patch centred at (i,j) of shape C'×H'×W'; and by reshaping the tensor kernel k into a matrix K of size C'H'W'×N'

$$K = [\mathrm{vec}(k_1); \ldots ; \mathrm{vec}(k_{N'})],$$

then we observe that Property 1 the tensor convolution is equivalent to the matrix-matrix product $$\underbrace{x_n * k}_{HW \times N'} = \underbrace{\phi(x_n)}_{HW \times C'H'W'} \times \underbrace{K}_{C'H'W' \times N'}$$

and the derivative of the convolution w.r.t. to the tensor kernel k is $$\frac{\partial x_n * k}{\partial K} = \phi(x_n)$$

Thus, the tensor convolution of a batch of N images x with kernel k consists in applying N matrix-matrix products, which efficient linear algebra packages implement very efficiently. Note that the φ function can be implemented with the famous im2col function in MATLAB or Python.

At each iteration of the training stage, the gradient of the tensor convolution is computed to update the weights of kernel k and is back propagated to previous layers because of the chain rule.

Let us define a global scene probability vector.

Definition 3 A global scene probability vector is defined as vector of arbitrary dimension where the k-th vector entry is the confidence value to an attribute of just one classification of global context descriptor.

For example entries of the vector can correspond to 'Kitchen', 'Living-Room', 'Urban' Locale descriptors and so on.

To identify the regional context descriptors at each pixel, it is assumed that we have a training set of images $x_n$ where each pixel $x_n[., i,j]$ is annotated with a probability vector $y_n[., i,j]$. This leads us to define a regional scene probability tensor.

Definition 4 A regional context probability tensor c is defined as a tensor of probability vectors in $[0,1]^{N \times C' \times H \times W}$ where c[n,k,i,j] quantifies a confidence value for the k-th regional descriptor for each pixel $x_n[., i, j]$.

Notice that the regional context probability tensor has the same width and height as the image tensor x. Only the depth of tensor differs.

Multi-Objective Loss Function and Weight Sharing. One dedicated CNN may be trained to predict each type of global context descriptor (locale, mood and so on). Classically, the training stage is formulated as a parameter estimation problem. To this end, a differentiable loss function l(CNN(x), y) is needed to measure the error between the estimated probability vector CNN(x) and the ground-truth probability vector y where each entry y[k] is 0 everywhere except for the one at some index k where the value is 1.

Then the training stage minimises the sum of errors over all the data $(x_i, y_i)$, i=1 . . . , N, in the training data:

$$\min_{k_1, \ldots, k_{|V|}} \sum_{i=1}^{N} \ell(CNN(x_i; k_1, \ldots, k_{|V|}), c_i)$$

with respect to the parameters $(x_i, y_i)$, i=1, . . . , N of each layer v that composes the CNN. The objective function is differentiable w.r.t. the parameters $k_v$, v=1 . . . $\sqrt{V}\sqrt{}$ and the stochastic gradient descent method incrementally updates the parameters $k_v$, v=1 . . . $\sqrt{V}\sqrt{}$ by feeding batches of images.

Each CNN may be trained jointly in a computationally efficient manner in terms of speed and memory consumption as follows. First we let them share the same convolutional layers. Only the last layers differ so that each CNN learn a specific global scene descriptor. Second, we define a multi-objective loss function as a (possibly weighted) sum of all the errors $$\ell\left(\begin{bmatrix} CNN_1(x) \\ \vdots \\ CNN_K(x) \end{bmatrix}, \begin{bmatrix} c_1 \\ \vdots \\ c_K \end{bmatrix}\right) = \sum_{k=1}^{K} w_k \ell_k(CNN_k(x), c_k)$$

Each $CNN_k$ corresponds to the locale predictor, mood predictor and so on. They are applied to the image tensor x to estimate either a global scene probability vector or a regional probability tensor $CNN_k(x)$. Each loss function $l_k$ evaluates the distance between the estimate tensor $CNN_k(x)$ and the ground-truth tensor $c_k$. Thus during the training stage, the back propagated errors from the multi-objective loss function enables the weights of the shared convolutional layers to become optimal w.r.t. all the classification tasks.

Like the regional context probability tensor, we define the insertion probability tensor as follows.

Definition 5 An insertion probability tensor a is defined as a tensor of probability vectors in $[0,1]^{N \times C' \times H \times W}$ where a[n, k,i,j] quantifies a confidence value for a class of insertion descriptor.

The insertion probability vector can just encode the insertion object embed type for example, vehicle, soda bottle, cell phone, etc. or not suitable for object insertion. Each entry $a_n [., i, j]$ encodes the confidence value that, for example, pixel $x_n[.,i,j]$ is:

k=1: not suitable for object insertion advertising, k=2: suitable for insertion of a vehicle type of object product placement, k=3: suitable for insertion of a soda bottle type of object signage placement, k=4: suitable for insertion of a cell phone type of object. And so on.

It will be appreciated that this is just one particular example of the types of object that may be identified in the insertion probability vector and that any number of additional or alternative types of object may be identified in the insertion probability vector.

The above definitions have helped to explain how the corpus of training images may be annotated, and consequently how a trained machine learning system may then annotate the plurality of frames of the source video (for example, the scene descriptor sub-module 610 may be trained to annotate a global context probability vector and/or a regional context probability vector(s) for each pixel of the frames in the way described above in relation to the scene descriptor probability vector, and the identification sub-module 620 may be trained to annotate each pixel of the frames with an insertion probability vector described above). Therefore, we shall now briefly describe ways in which the machine learning training may be carried out.

Interpreting Feature Maps in the Recognition of Global Scene Descriptors

We show below VGG-16, an example of CNN architecture used for image classification for 1000 classes.

Figure 11:
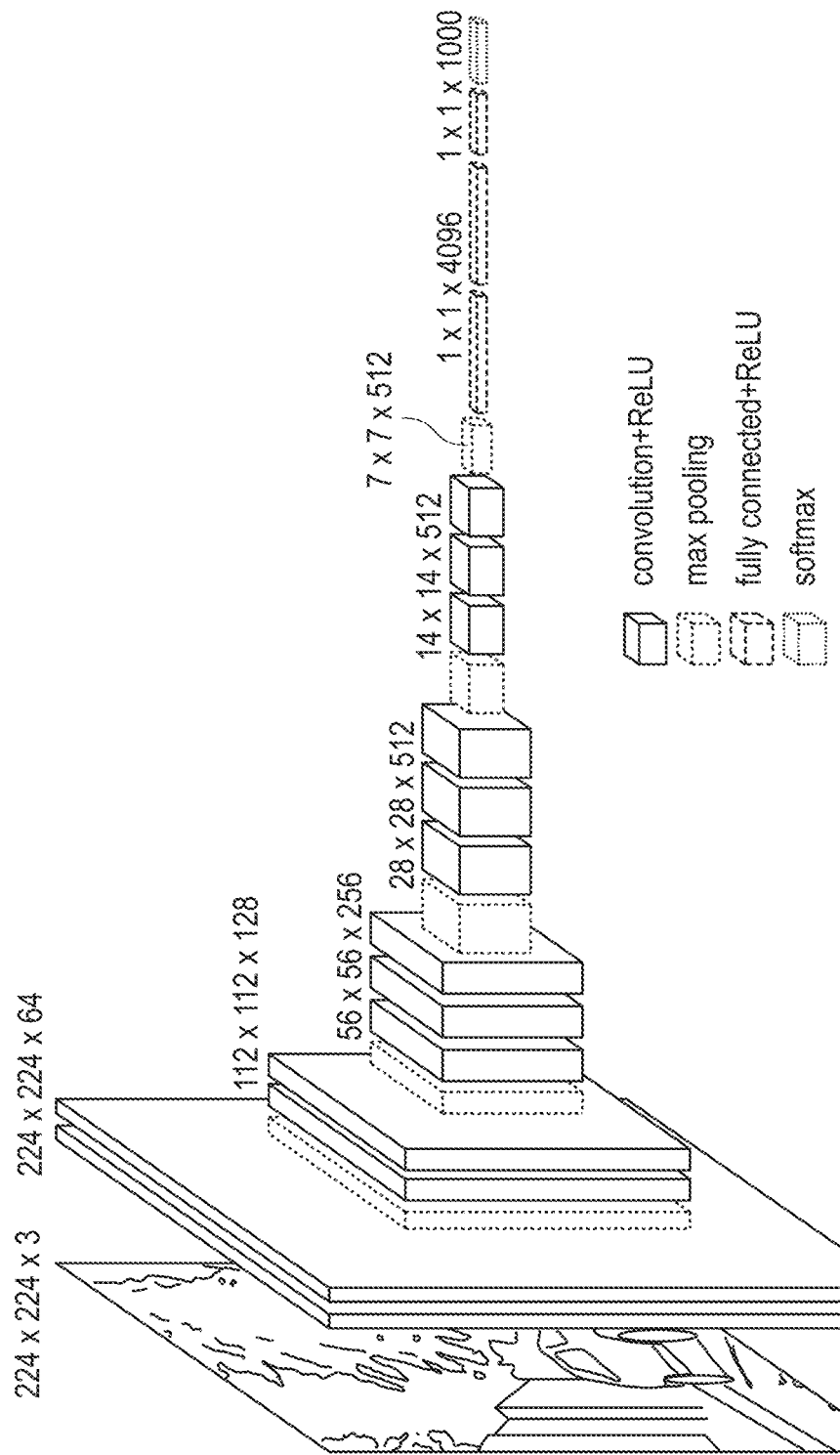
FIG. 11 shows the intermediate results of a CNN at different stages upon feeding an image.

FIG. 11 shows the intermediate results of the CNN at different stages upon feeding an image. In this particular classification task, the input of the CNN is an image and is represented as a 3D volume of width 224, of height 224, of depth 3.

The output is the softmax block which is 1000D probability vector.

The computational flow in a CNN is as follows:

The image is first transformed into a feature map 224×224×64 after the first convolution+ReLU block. The feature map describes each pixel (i,j) ∈ [1, 224]×[1, 224] of the image with a 64D feature vector as the result of 64 different convolutional kernels.

The first feature map 224×224×64 is transformed into a second feature map 224×224×64 after a second convolution+ReLU block. Again the second feature map describes each pixel (i,j) ∈ [1, 224]×[1, 224] of the image with a 64D feature vector as the result of 64 different convolutional kernels.

The second feature map is then transformed by a max-pooling layer into a third feature map 112×112×64. The feature map can be interpreted as a grid of 112×112 image blocks. Each block (i, j) corresponds to a non overlapping image patch (i, j) of 2×2 pixels in the original image. Each block is described by a 64D feature vector (not 128D as the image would mislead to.)

The third feature map is then transformed by a convolution+ReLU block into a fourth feature map 112×112×

64. Each block (i, j) corresponds to a non overlapping image patch (i,j) of 2×2 pixels in the original image and is described by a 128D feature vector as the result of 128 convolution kernels.

And so on as the reader will appreciate how the remaining feature maps are generated by pursuing the reasoning above.

Consequently we easily understand that a CNN builds a multiscale representation due to the max-pooling operation. In the case of VGG-16, we observe namely at the end of each max-pooling function, the image is successively represented as:
- a grid of 112×112 image blocks, each block describing a non-overlapping image patch of 2×2 pixels of the original image with a 64D vector;
- a grid of 56×56 image blocks, each block describing a non-overlapping image patch of 4×4 pixels with a 256D feature vector;
- a grid of 28×28 image blocks, each block describing a non-overlapping image patch of 8×8 pixels with a 512D feature vector;
- a grid of 14×14 image blocks, each block describing a non-overlapping image patch of 16×16 pixels with 512D feature vector.

After which, the coarsest grid of 14×14 image blocks is used eventually transformed into a 1000D probability vector from the last layers being composed of inner-product, dropout and softmax layer altogether forming what is called a perceptron network.

Recognition of Regional Context Descriptors

To compute a specific regional context probability vector, the original VGG-16 architecture is not directly suited to perform pixel classification. However we have pointed out previously that VGG-16 builds a multiscale (or pyramidal) representation of the input image. As a first approach, every pixel of the original image can be described by concatenating the feature vector at every layer of the pyramid.

Intuitively, the sole colour value of the pixel not always enough whether it corresponds to a skin pixel, because the skin colour is not uniform. However if we analyse the mean colour of the neighbouring pixels with varying neighbourhood size, it becomes more and more obvious to the CNN model to infer that the pixel is indeed a skin pixel.

Fully convolutional networks and variant networks exploit and refine this intuition with deconvolutional layers.

Human Action Recognition via LSTM network

It is convenient to describe the human activity by means of sentence and a LSTM is designed to predict a sequence of words. To enable the machine to predict such a sequence of words, it suffices to replace the perceptron network by a LSTM network. Unlike usual layers, the LSTM maintains a state, encoded by a cell state vector. This vector can be thought as a 'memory' continuously built from the past predictions and this is one aspect of the LSTM that ensures the temporal coherence of predictions.

The LSTM is updated by a set of transition matrices and weight matrices. The matrices are the parameters optimized during the training stage. One role of these matrices is to update the cell state vector (the 'memory') by appropriately weighting the importance of the new prediction. We will not detail further the mathematical mechanisms of the LSTM network and the reader should just understand that an LSTM is just another differentiable function. Thus a vanilla stochastic gradient method during the training stage works as usual.

Experimentally such a network using VGG-16+LSTM has shown impressive results in the automatic captioning of images using.

Recognition of Insertion Descriptors

To recognise insertion descriptors, we employ a SVM-based approach. A SVM is a classification algorithm useful for predicting whether an object belongs to a particular class, and may be used in supervised learning applications. A SVM-based classifier can only perform a binary classification. While it may seem a limitation, it can be generalised to a robust multiclass classification as follows.

In the indirect approach, we train a dedicated SVM classifier for each class of brand category, for example, "Kitchen Appliances", using a one-vs-all strategy, where the training data is composed of positive samples, i.e., images relevant for "kitchen appliances", and negatives, i.e., images irrelevant for "kitchen appliances".

After the training stage, each class-specific classifier computes a prediction score for a new unseen image. It should provide a positive score when the image is suitable for such a brand category and a negative score when it is not. The higher the score the more suitable the image is for the brand category. It is then possible to establish a ranking of brand categories. One advantage of using SVM instead of CNN is that we can incrementally learn to recognise a new brand category without having to start the learning process from scratch. Another advantage is that SVM will behave better than CNN where the classes are not mutually exclusive. For the brand category classification problem, a scene can be suitable for many brand categories indeed. However unlike CNN, the SVM is unable to learn a transformation of the image data into an efficient feature vector. Rather a SVM requires a feature representation beforehand to ensure good prediction results for the appropriate recognition task.

Semi-Supervised Learning for Less Labour-Intensive Annotation

There are some ways to train learning systems. The easiest but most labour-intensive approach is the supervised learning approach where each training sample are required to be fully annotated. In particular, for the prediction of regional context descriptor, every pixel of the image may be annotated. The hardest but less labour-intensive approach is the semi-supervised learning approach.

Obtaining annotations for each training video shot is an expensive and time-consuming task. In practice, it may be more efficient not to annotate every single pixel for regional context vector and instead provide a not necessarily complete yet sufficient amount of annotations.

In particular we may want to allow the training to contain loosely or partially annotated video shots, e.g., bounding boxes, scribbles. Semi-supervised learning algorithms tackles such problems.

Temporal Coherence using LSTM

Video Networks. The submodule 610 may be extended to Video data rather than on image frames because of the generality of convolutional neural networks. However, video networks are not practical. Most importantly it raises the question of appropriately video data along the temporal dimension which potentially means losing information and a drop of accuracy in the prediction task.

LSTM and Variants. Instead it is in practice more efficient to use LSTM network to ensure temporal coherence instead of a perceptron network. The LSTM remains applicable to locale detection, mood detection, regional context descriptor, blue box prediction as it simply means to replace the perceptron network by a LSTM network in each corresponding CNN. Notice that they are numerous variant methods that borrows the same principle of LSTM in the semantic segmentation tasks. Let us mention for example the clockwork approaches.

Figure 8:
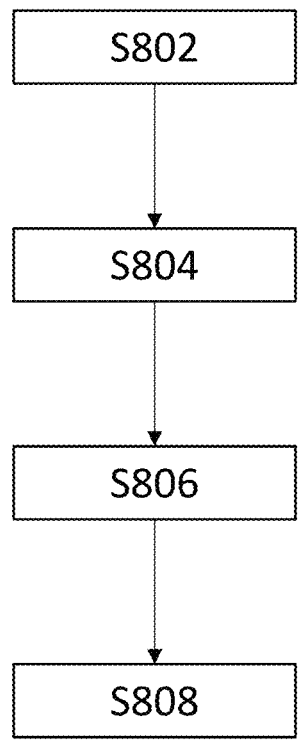
FIG. 8 shows example steps of a process for the training the machine learning of the scene descriptor sub-module of the system of FIG. 1.

FIG. 8 shows example steps of a process 800 for the training the machine learning of the scene descriptor sub-module 610 and identification sub-module 620 in order to determine scene descriptors as described earlier. The scene descriptor sub-module 610 may comprise a CNN, which in step S802 is provided with a corpus of training images that are annotated with scene descriptor probability vectors as described above. This is to provide the CNN with the means to learn the features of images which can be associated with scene descriptors, as described above. The last layers of the CNN may be used to extract generic visual recognition features relating to regional context descriptors and/or global context descriptors. The neural network model comprising weights and predictions for the scene descriptors is developed in step S804. The identification sub-module may comprise an SVM model for identifying candidate insertion zones and a further CNN/CVM model for determining corresponding candidate object types. The neural network model comprising weights and predictions may be provided to the identification sub-module 620 to train an SVM to predict the most useful scene descriptors for use in determining the candidate object types in step S808. Prior to providing the generic visual recognition features created from the activations in the last layers of the CNN to the SVM, various pre-processing steps S806 may be implemented to refine the process at the SVM stage. This can include L2 normalising the features, or combining the features from different patches in the image.

Having trained the scene descriptor sub-module 610 and identification sub-module 620, they may then process the image contents of the plurality of frames of the source video as follows:

1. a CNN-based model in the scene descriptor sub-module 610 generates for the scene a heat map for each scene descriptor (for example, by determining a regional context probability vector for each pixel the plurality of frames, in which case a 2D heat map of regional context probability would be generated for each frame, with the temporal element by virtue of the heats maps for the plurality of frames);
2. an SVM model in the identification sub-module 620 which then identify the candidate insertion zones within the image contents based on the scene descriptors;
3. a further CNN/SVM model in the identification sub-module 620 then determines the corresponding insertion descriptors for each candidate insertion zone.

Direct Approach

As explained above in respect of the "indirect approach", there may be a correlation between particular scene descriptors and types of object that are suitable for insertion into the scene. However, it has been realised that in some instances, different scene descriptors may be orthogonal for two reasons:

For example, let us consider placing a wine bottle on a dining table. From a purely context point of view, the association table-bottle would appear more correct than the association wall-bottle. Therefore, every table pixel may be considered more relevant than a wall pixel for a wine bottle placement. Consequently, a correlation between table and bottle may be inferred, whereas a correlation between wall and bottle may not.

From the point of view of a content analyst or an embed artist, however, it may be slightly subtler than that. First, because of the 3D geometry, the placed bottle will need to occupy at least some table pixels and possibly some wall pixels. Second, not every single table pixel has the object insertion impact: if a character is sitting at a dining table, it may have more impact inserting the bottle next to the character's hand, rather than at the other end of the table.

Learnable Statistical Properties of Insertion Zones. Our data show that insertion zones suitable for object insertion identified by content analysts are very often dependent on their positioning relative to other 'things' in the image contents. For example, they may choose insertion zones that are "parts of a table that are close to arms and hands of characters". Likewise, signage placement opportunities may very often of the type, "outdoor building walls" rather than "indoor walls".

Furthermore specific object types relevant to different types of surface, for example table-top, work surface, and bar counter, can be learnt jointly.

These two observations have a non-trivial consequence. Whilst the scene descriptors described above in relation to the "indirect approach" may be very useful, they may not actually be necessary for identifying candidate insertion zones and determining candidate object types that are suitable for insertion into the candidate insertion zone. A machine learning system, for example one using Deep Neural Networks, may be able to capture the striking statistical properties of insertion zones and, therefore, simultaneously identify candidate insertion zones and determine candidate object types for those identified candidate insertion zones. This is referred to in the present disclosure as the "direct" approach, since machine learning is used to identify and determine the candidate insertion zones and candidate object types directly, in a single step, from processing the image content of the plurality of frames (in contrast to the "indirect" approach, where the image contents of the plurality of frames are first processed using machine learning to determine the scene descriptors, and the candidate insertion zones and candidate object types then determined in a second machine learning step from the scene descriptors).

Figure 9:
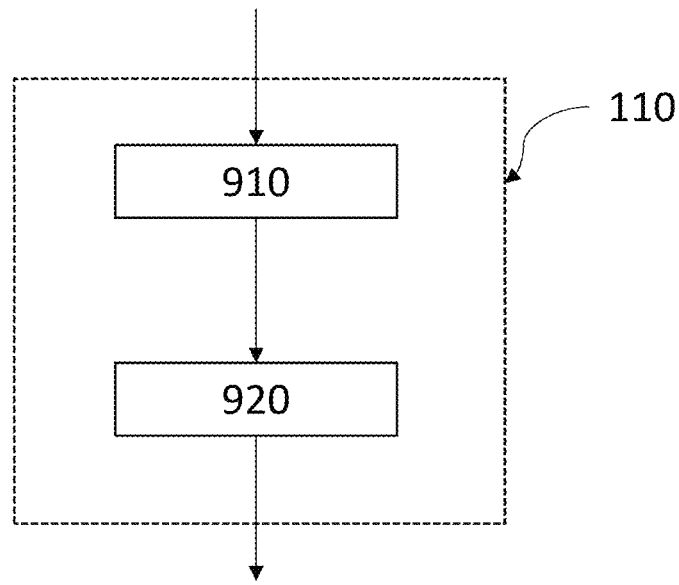
FIG. 9 shows a second example schematic representation of a configuration of the candidate insertion zone module of the system of FIG. 1.

FIG. 9 shows an example schematic representation of a configuration of the candidate insertion zone module 110 for carrying out the "direct approach". As can be seen, the insertion zone and insertion object identification sub-module 910 receives the plurality of frames of a scene and processes the image contents of the frames to identify the candidate insertion zone(s) and the one or more candidate object types.

The insertion zone and insertion object identification sub-module 910 may comprise a CNN model that may be trained in a similar way to that described above. In this way, the insertion zone and insertion object identification sub-module 910 may be able to learn what sort of image characteristics (for example, types of scene descriptors, relative positioning of regional context descriptors) may determine the size and positioning of insertion zones, and in turn may lend themselves to the insertion of particular types of object. Since in the training corpus objects will typically have been inserted into the image contents for particular reasons, for example particular object types will have been inserted into the image because they fit in well with the rest of the image contents and/or objects may be inserted closer to particular characters in order to increase the impact of the inserted object (as explained earlier), the insertion zone and insertion object identification sub-module 910 should inherently learn this from the training corpus. Consequently, when the trained insertion zone and insertion object identification sub-module 910 processes the plurality of frames of a new source video, it may naturally identify candidate insertion zones to be in the best regions of the image contents (for example, in the table and wall pixels close to a character's hand for the insertion of a wine bottle, rather than in table pixels well away from a character's hand, as described earlier in the 'indirect' approach section).

Similarly to the identification sub-module 620 described earlier, the insertion zone and insertion object identification sub-module 910 may output an annotated version of the plurality of frames, the annotations comprising an insertion probability vector for each pixel. The post processing sub-module 920 may be configured to operate in the same way as the post-processing sub-module 640 described earlier and output an identification of the candidate insertion zone and corresponding insertion descriptor as described earlier. However, the post-processing sub-module 920 is optional and in an alternative, the candidate insertion zone module 110 may simply output the annotated plurality of frame generated by the insertion zone and insertion object identification sub-module.

In the above described "direct" and "indirect" implementations, the training of the machine learning modules is carried out using a corpus of training images that are annotated with scene descriptors and insertion descriptors. However, in some instances, a sufficiently large body of training material comprising these annotations may not be available. For example, there may be a large corpus of images that have been annotated by a content analyst or embed artist with insertion descriptors, but not any scene descriptors, since the content analyst or embed artist may have been tasked only with inserted objects into those images. In this case, the "direct" approach may still be effective, since it may still implicitly learn the different characteristics of the images that have led to the content analyst or embed artist to choose the insertion zone and insertion object that they have chosen. However, it may still be preferable for the machine learning module to learn how to recognise scene descriptors for images in order further to improve its identification of candidate insertion zones and determination of candidate object types. In this case, where a training corpus comprising only insertion descriptors is available, other trained machine learning modules may be utilised as part of the training process.

Figure 10:
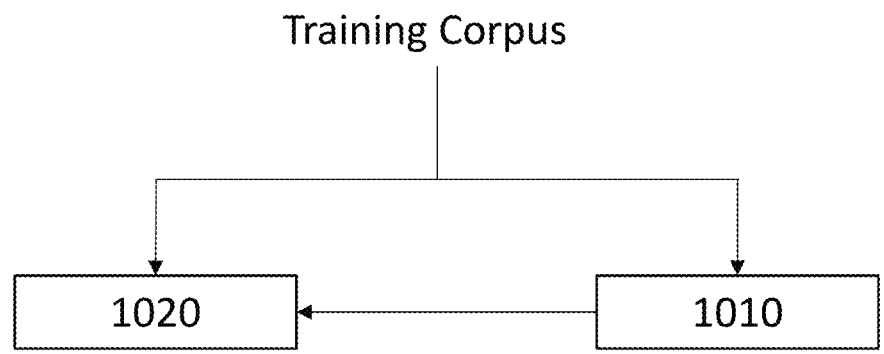
FIG. 10 shows an example representation of a training system for training the candidate insertion zone module of the system of FIG. 1.

FIG. 10 shows an example representation of a training system comprising a trained machine learning module 1010 and a machine learning module to be trained 1020. The machine learning module to be trained 1020 may be the scene descriptor sub-module 610 and identification sub-module 620 of the "indirect approach" above, or the insertion zone and insertion object identification sub-module 910 of the "direct approach" above. In this example, a training corpus annotated with insertion zone descriptors is available. This is fed to both the trained machine learning module 1010 and the machine learning module to be trained 1020. The trained machine learning module 1010 may be trained to identify scene descriptors (for example, it may be trained to perform regional context recognition), such that it can identify scene descriptors for the training corpus of images and feed those to the machine learning module to be trained 1020 (for example, as with scene descriptor probability vector annotations of the training corpus of images). Thus, the machine learning module to be trained 1020 may still be trained to operate as described earlier using a training corpus of images that lacks scene descriptors, by utilising an existing trained machine learning module 1010.

Optionally, for both the direct and indirect approaches described above, an operator or user may provide feedback on the identified candidate insertion zone and/or insertion zone descriptor to the candidate insertion zone module 110. This optional implementation is represented in FIG. 12, which is very similar to FIG. 1, but includes the additional user/operator feedback.

A user or operator may review the identified candidate insertion zone and/or insertion zone descriptor in any suitable form (for example, by reviewing the object insertion suggestion frame and/or the insertion zone suggestion frame, etc) and assess its suitability for the image contents of the plurality of frames. In this way, a skilled operator or user may utilise their object insertion expertise to appraise the suitability of the candidate insertion zone and/or insertion zone descriptor that has been determined at least in part using machine learning.

The feedback may take any suitable form, for example the user may indicate if the identified candidate insertion zone and/or insertion zone descriptor are suitable or unsuitable for the image contents of the plurality of frames, or they may rate the suitably, for example on a scale of 0-5 or 0-10 or 0-100, etc. The feedback may then be used to improve the machine learning algorithms that have been used in the candidate insertion zone module 110, so that the quality or suitability of the candidate insertion zone and/or insertion zone descriptor determined in the future may be improved.

The skilled person will readily appreciate that various alterations or modifications may be made to the above described aspects of the disclosure without departing from the scope of the disclosure.

For example, optionally, the system 100 may further comprise a final insertion module configured to receive an object or additional material for insertion into the scene of the source video and generate output material comprising at least part of the source video and the received object or additional material inserted into the candidate insertion zone. The received object or additional material may be of the type indicated by the candidate object type. The object or additional material may be received, for example, from a data store/library of additional material (which may be part of, or separate from, the system 100) by virtue of retrieval based on the insertion zone descriptor, or by any other means. In this way, the final insertion module may function similarly to the object insertion module 140, as described above, but rather than create an object insertion suggestion frame, it may actually insert the object into the image content of the plurality of frames of the scene. The insertion itself may take place according to any standard techniques that would be well understood by the skilled person. The receipt and insertion of the object or material may be automatic, or may take place after receiving approval from a user who has considered the candidate insertion zone and the type of object that recommended as being suitable for insertion into the candidate insertion zone. In this way, a suitable object or additional material may be inserted into the image contents of a scene quickly and reliably.

Where the insertion is automatic, the system 100 may be configured such that it's only output is the output material comprising the object or additional material inserted into the candidate insertion zone. Where the insertion takes place after user approval, the system 100 may output at least one of: an identification of the candidate insertion zone and candidate object types; the objective insertion suggestion frame; and/or the insertion zone suggestion frame. After receipt of user approval, the system 100 may then output the output material comprising the object or additional material inserted into the candidate insertion zone.

Furthermore, FIGS. 1, 6, 9 and 10 comprise various interconnected modules/entities. However, the functionality of any two or more of the modules/entities may be performed by a single module, for example the functionality of the candidate insertion zone module 110 and the object insertion module 140 may be implemented by a single entity or module. Likewise, any one or more of the modules/entities represented the Figures may be implemented by two or more interconnected modules or entities. For example, the functionality of the scene descriptor sub-module 610 may be implemented as a system of interconnected entities that are configured to together perform the functionality of the scene descriptor sub-module 610. The entities/modules represented in the Figures (and/or any two or more modules that may together perform the functionality of an entity/module in the Figures) may be co-located in the same geographical location (for example, within the same hardware device), or may be located in different geographical locations (for example in different countries). They may be implemented as only a part of a larger entity (for example, a software module within a multi-purpose server or computer) or as a dedicated entity.

The aspects of the disclosure described above may be implemented by software, hardware, or a combination of software and hardware. For example, the functionality of the candidate insertion zone module 110 may be implemented by software comprising computer readable code, which when executed on the processor of any electronic device, performs the functionality described above. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. The computer-readable medium may be distributed over network-coupled computer systems so that the computer readable instructions are stored and executed in a distributed way. Alternatively, the functionality of the candidate insertion zone module 110 may be implemented by an electronic device that is configured to perform that functionality, for example by virtue of programmable logic, such as an FPGA.

FIG. 13 shows an example representation of an electronic device 1300 comprising a computer readable medium 1310, for example memory, comprising a computer program configured to perform the processes described above. The electronic device 1300 also comprises a processor 1320 for executing the computer readable code of the computer program. It will be appreciated that the electronic device 1300 may optionally comprise any other suitable components/modules/units, such as one or more I/O terminals, one or more display devices, one or more further computer readable media, one or more further processors, etc.

It is claimed:

1. A system, including a processor and memory, comprising:
    the processor executing instructions which cause the processor to operate as a candidate insertion zone module, the candidate insertion zone module configured to:
    receive a plurality of frames of a scene of a source video, wherein each of the plurality of frames comprises a plurality of pixels; and
    process, at least in part using machine learning, image contents of the plurality of frames to:
        determine, for at least some of the pixels of the plurality of frames of the scene, an insertion probability vector comprising a probability value for each of a plurality of insertion labels, each probability value being indicative of the likelihood that the type of insertion indicated by the corresponding insertion label is applicable to the pixel,
    wherein the insertion probability vectors are indicative of a candidate insertion zone for the insertion of an object into the image content of at least some of the plurality of frames and a candidate object type indicative of a type of object that is suitable for insertion into the candidate insertion zone.

2. The system of claim 1, wherein the instructions further cause the candidate insertion zone module to operate including an identification sub-module, the identification sub-module configured to:
    perform the determination of the insertion probability vectors.

3. The system of claim 2, wherein the plurality of insertion labels comprises:
    a label indicative of the pixel not being suitable for insertion of an object; and
    one or more labels indicative of a corresponding one or more types of object.

4. The system of claim 2, wherein the candidate insertion zone comprises a plurality of pixels having insertion probability vectors that all have a maximum argument of probability values corresponding to a label that is indicative of the candidate object type.

5. The system of claim 2, wherein the instructions further cause the candidate insertion zone module to operate including a scene descriptor sub-module, the scene descriptor sub-module configured to:
    process, using machine learning, image contents of at least some of the plurality of frames to determine a scene descriptor, wherein
    determination of the insertion probability vectors is based at least in part on the scene descriptor.

6. The system of claim 5, wherein:
    determination of the insertion probability vectors is based at least in part on the scene descriptor.

7. The system of either claim 5, wherein the scene descriptor comprises at least one regional context descriptor indicative of an identified entity in the scene.

8. The system of claim 7, wherein
    the scene descriptor sub-module is configured to process, using machine learning, image contents of the plurality of frames to determine, for at least some of the pixels of the plurality of frames of the scene, a regional context probability vector comprising a probability value for each of a plurality of regional context labels, each probability value being indicative of the likelihood that the type of entity indicated by the corresponding regional context label is applicable to the pixel.

9. The system of claim 8, wherein the plurality of regional context labels comprises:
    a label indicative of the pixel not relating to anything; and
    at least one of:
    one or more labels indicative of a human;
    one or more labels indicative of an animal;
    one or more labels indicative of an object;
    one or more labels indicative of a surface.

10. The system of claim 1, wherein the instructions further cause the candidate insertion zone module to operate including an insertion zone and insertion object identification sub-module, the insertion zone and insertion object identification sub-module configured to:
    perform the determination of the insertion probability vectors.

11. The system of claim 10, wherein the plurality of insertion labels comprises:
a label indicative of the pixel not being suitable for insertion of an object; and one or more labels indicative of a corresponding one or more types of object being suitable for insertion in the pixel.

12. The system of claim 10, wherein the candidate insertion zone comprises a plurality of pixels having insertion probability vectors that all have a maximum argument of probability values corresponding to a label that is indicative of the candidate object type.

13. The system of claim 1, wherein the instructions cause the processor to operate as a segmentation module, the segmentation module configured to:
generate an insertion zone suggestion frame comprising a frame of the plurality of frames overlaid with a visualisation of the candidate insertion zone.

14. The system of claim 1, wherein the instructions cause the processor to operate as an object insertion module, the object insertion module configured to:
select an object for insertion based on the candidate object type; and
generate an object insertion suggestion frame comprising a frame of the plurality of frames and the selected object inserted in the candidate insertion zone.

15. The system of claim 1, wherein the instructions further configure the candidate insertion zone module to:
receive feedback from an operator, wherein the feedback is indicative of the suitability of the identified candidate insertion zone and/or the candidate object type for the image contents of the plurality of frames; and
modify the machine learning based at least in part on the feedback.

16. A method of processing the image contents of a plurality of frames of a scene of a source video, the method comprising:
receiving the plurality of frames of the scene of the source video; and
processing, at least in part using machine learning, image contents of the plurality of frames to:
determine, for at least some of the pixels of the plurality of frames of the scene, an insertion probability vector comprising a probability value for each of a plurality of insertion labels, each probability value being indicative of the likelihood that the type of insertion indicated by the corresponding insertion label is applicable to the pixel,
wherein the insertion probability vectors are indicative of a candidate insertion zone for the insertion of an object into the image content of at least some of the plurality of frames and a candidate object type indicative of a type of object that is suitable for insertion into the candidate insertion zone.

17. A computer program for carrying out the method of claim 16 when executed on the processor of an electronic device.

18. A method of training a candidate insertion zone module to identify candidate insertion zones and one or more candidate objects for insertion in a scene of a source video, the method comprising:
receiving a training corpus comprising a plurality of images, each annotated with identification of at least one insertion zone and one or more candidate object types for each insertion zone; and
training the candidate insertion zone module using machine learning and the training corpus to process image contents of a plurality of frames of the source video to:
determine, for at least some of the pixels of the plurality of frames of the scene of the source video, an insertion probability vector comprising a probability value for each of a plurality of insertion labels, each probability value being indicative of the likelihood that the type of insertion indicated by the corresponding insertion label is applicable to the pixel,
wherein the insertion probability vectors are indicative of a candidate insertion zone for the insertion of an object into the image content of at least some of the plurality of frames and a candidate object type indicative of a type of object that is suitable for insertion into the candidate insertion zone.

19. The method of claim 18, wherein at least some of the plurality of images in the training corpus are each further annotated with a scene descriptor, and wherein the candidate insertion zone module is further trained using machine learning to:
identify at least one scene descriptor for the image content of at least some of the plurality of frames; and
determine the insertion probability vectors based at least in part on the identified at least one scene descriptor.

20. The method of claim 18, further comprising:
determining one or more scene descriptors for at least some of plurality of images in the training corpus using a trained machine learning module configured to identify a scene descriptor by processing the content of an image; wherein
training the candidate insertion zone module using machine learning further comprises training the candidate insertion zone module to:
identify at least one scene descriptor for the image content of at least some of the plurality of frames; and
determine the insertion probability vectors based at least in part on the identified at least one scene descriptor.

* * * * *